(12) United States Patent
Pezeshki et al.

(10) Patent No.: US 11,589,394 B2
(45) Date of Patent: Feb. 21, 2023

(54) MANAGING BEAM FAILURE RECOVERY RANDOM ACCESS

(71) Applicant: QUALCOMM Incorporated, San Diego, CA (US)

(72) Inventors: Hamed Pezeshki, San Diego, CA (US); Yan Zhou, San Diego, CA (US); Tao Luo, San Diego, CA (US); Ruhua He, San Diego, CA (US); Yong Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/174,751

(22) Filed: Feb. 12, 2021

(65) Prior Publication Data

US 2021/0259022 A1 Aug. 19, 2021

Related U.S. Application Data

(60) Provisional application No. 62/976,331, filed on Feb. 13, 2020.

(51) Int. Cl.
*H04W 74/08* (2009.01)
*H04W 74/04* (2009.01)
(Continued)

(52) U.S. Cl.
CPC ....... *H04W 74/0833* (2013.01); *H04L 5/0048* (2013.01); *H04W 72/042* (2013.01);
(Continued)

(58) Field of Classification Search
None
See application file for complete search history.

(56) References Cited

U.S. PATENT DOCUMENTS

2018/0343653 A1* 11/2018 Guo .................. H04W 72/1273
2019/0053294 A1* 2/2019 Xia .................... H04W 74/0833
(Continued)

FOREIGN PATENT DOCUMENTS

WO 2019039989 A1 2/2019
WO 2019119399 A1 6/2019
(Continued)

OTHER PUBLICATIONS

International Search Report and Written Opinion—PCT/US2021/018055—ISA/EPO—dated Jun. 24, 2021 24 pages.
(Continued)

*Primary Examiner* — Andrew C Oh
(74) *Attorney, Agent, or Firm* — The Marbury Law Group

(57) ABSTRACT

Embodiments include methods that may be performed by a processor of a mobile device and a processor of a base station for managing beam failure recovery (BFR). The processor of the mobile device may determine whether a beam failure of a communication link with a base station has occurred, determine whether contention free random access (CFRA) resources have been configured in response to determining that a beam failure has occurred, and initiate contention based random access (CBRA) in response to determining that CFRA resources have not been configured. The processor of the base station may receive from the mobile device a message initiating CBRA, determine whether a downlink beam or quasi-colocation (QCL) assumption a downlink resource of a physical random access channel (PRACH) is different from any active downlink beam or QCL assumption, and perform CBRA with the mobile device.

26 Claims, 14 Drawing Sheets

(51) Int. Cl.
*H04W 72/04* (2023.01)
*H04L 5/00* (2006.01)
*H04W 76/19* (2018.01)

(52) U.S. Cl.
CPC ....... *H04W 72/0413* (2013.01); *H04W 74/04* (2013.01); *H04W 76/19* (2018.02)

(56) References Cited

U.S. PATENT DOCUMENTS

| | | | |
|---|---|---|---|
| 2019/0068268 A1* | 2/2019 | Zhang | H04W 76/27 |
| 2019/0190582 A1* | 6/2019 | Guo | H04W 72/046 |
| 2019/0239212 A1* | 8/2019 | Wang | H04W 72/0413 |
| 2019/0253949 A1* | 8/2019 | Park | H04B 7/0695 |
| 2019/0253966 A1* | 8/2019 | Park | H04L 5/0091 |
| 2019/0261234 A1* | 8/2019 | Park | H04W 36/0069 |
| 2019/0327769 A1* | 10/2019 | Yang | H04W 72/046 |
| 2020/0045569 A1* | 2/2020 | Seo | H04L 5/0053 |
| 2020/0119799 A1* | 4/2020 | Jung | H04W 52/228 |
| 2020/0127883 A1* | 4/2020 | Liu | H04W 74/0833 |
| 2020/0145089 A1* | 5/2020 | Wei | H04W 76/27 |
| 2020/0177266 A1* | 6/2020 | Kang | H04W 76/27 |
| 2020/0205193 A1* | 6/2020 | Amuru | H04B 7/088 |
| 2020/0221429 A1* | 7/2020 | Li | H04L 5/0053 |
| 2020/0245333 A1* | 7/2020 | Lin | H04L 5/10 |
| 2020/0259546 A1* | 8/2020 | Yang | H04W 24/08 |
| 2020/0367079 A1* | 11/2020 | Chen | H04W 76/19 |
| 2020/0413395 A1* | 12/2020 | Chen | H04L 5/0053 |
| 2021/0021321 A1* | 1/2021 | Liu | H04W 76/18 |
| 2021/0037590 A1* | 2/2021 | Yang | H04W 76/18 |
| 2021/0076442 A1* | 3/2021 | Matsumura | H04B 7/088 |
| 2021/0282168 A1* | 9/2021 | Matsumura | H04L 41/0654 |
| 2021/0306867 A1* | 9/2021 | Hamidi-Sepehr | H04W 72/046 |
| 2021/0320711 A1* | 10/2021 | Lee | H04W 74/0833 |
| 2021/0377948 A1* | 12/2021 | Bedekar | H04W 72/0493 |
| 2021/0400507 A1* | 12/2021 | You | H04W 52/02 |
| 2021/0409091 A1* | 12/2021 | Svedman | H04L 5/0051 |
| 2022/0039158 A1* | 2/2022 | Awadin | H04W 74/0816 |
| 2022/0110166 A1* | 4/2022 | Koskela | H04W 76/19 |
| 2022/0124633 A1* | 4/2022 | Hoshino | H04B 7/0634 |

FOREIGN PATENT DOCUMENTS

| | | |
|---|---|---|
| WO | 2019135654 A1 | 7/2019 |
| WO | 2019154319 A1 | 8/2019 |

OTHER PUBLICATIONS

Mediatek Inc: "Summary 3 on Remaining Issues on Beam Failure Recovery", 3GPP Draft, 3GPP TSG RAN WG1 Meeting #92bis, R1-1805730_7 1 2 2 4_SUMMARY_1_BFR_V08, 3rd Generation Partnership Project(3GPP), Sophia-Antipolis Cedex, France, vol. RAN WG1, No. Sanya, China, Apr. 16, 2018-Apr. 20, 2018, Apr. 24, 2018, XP051435684, 25 Pages, Retrieved from the Internet: URL: http://www.3gpp.org/ftp/tsg%5Fran/WG1%5FRL1/TSGR1%5F92b/Docs/, [retrieved on Apr. 24, 2018], Sections 1.-4, p. 13 section contention-based BFR.

* cited by examiner

MANAGING BEAM FAILURE RECOVERY RANDOM ACCESS

RELATED APPLICATIONS

This application claims the benefit of priority to U.S. Provisional Application No. 62/976,331 entitled "Managing Beam Failure Recovery Random Access" filed Feb. 13, 2020, the entire contents of which are hereby incorporated by reference for all purposes.

BACKGROUND

Fifth Generation (5G) New Radio (NR) systems can provide high data rate communication services to mobile devices. However, the frequency bands used to provide NR services, such as millimeter wave frequencies, are susceptible to rapid channel variations and suffer from free-space pathloss and atmospheric absorption. To address these challenges, NR base stations and mobile devices may use highly directional antennas to achieve sufficient link budget in wide area networks. Such highly directional antennas require precise alignment of the transmitter and the receiver beams, for example, using beam management operations. However, beam management operations may increase the latency of establishing a communication link, and may affect control layer procedures, such as initial access, handover and beam tracking.

If a mobile device determines that channel conditions are below a threshold, the mobile device may determine that a beam failure has occurred. If the mobile device detects a threshold number of beam failures, the mobile device may initiate a beam failure recovery process with the base station.

SUMMARY

Various aspects include systems and methods for managing beam failure recovery (BFR) performed by a processor of a mobile device. Various aspects may enable a mobile device to initiate a contention based random access channel procedure (CBRA) in case of beam failure in a communication link with a base station. Various aspects may include determining whether a beam failure of a communication link with a base station has occurred, determining whether contention free random access (CFRA) resources have been configured, and initiating contention based random access (CBRA) in response to determining that CFRA resources have not been configured. In some embodiments, initiating CBRA includes transmitting a physical random access channel (PRACH) preamble selected by the mobile device.

Some aspects may include identifying a random access channel (RACH) occasion in response to determining that a beam failure has occurred. In such aspects, determining whether CFRA resources have been configured in response to determining that a beam failure has occurred may include determining whether CFRA resources associated with the selected RACH occasion have been configured in response to determining that a beam failure has occurred.

In some aspects, determining that CFRA resources have not been configured may include determining that a downlink beam or quasi-colocation (QCL) assumption for a downlink reference signal (DL RS) that is mapped to the selected RACH occasion is different from any active downlink beam or QCL assumption.

In some aspects, determining that a downlink beam or QCL assumption for a DL RS that is mapped to the selected RACH occasion is different from any active downlink beam or QCL assumption may include determining that the downlink beam or QCL assumption for a DL RS that is mapped to the selected RACH occasion is different from any activated transmission configuration indicator (TCI) state for one or more of a physical downlink control channel (PDCCH) and a physical downlink shared channel (PDSCH). In some aspects, determining that a downlink beam or QCL assumption for a DL RS that is mapped to the selected RACH occasion is different from any active downlink beam or QCL assumption may include determining that the downlink beam or QCL assumption for a DL RS that is mapped to the selected RACH occasion is different from any activated TCI state for a PDCCH having a CORESET that is monitored for beam failure detection.

In some aspects, determining that CFRA resources have not been configured may include determining that a downlink beam or QCL assumption for a DL RS that is mapped to the selected RACH occasion is different from any active downlink beam or QCL assumption and an uplink beam or spatial relation for a physical random access channel (PRACH) is different from any active uplink beam or spatial relation. In some aspects, determining that CFRA resources have not been configured may include determining that an uplink beam or spatial relation for a PRACH is different from any active uplink beam or spatial relation.

Some aspects may further include determining based on one or more PRACH characteristics and on one or more other conditions to reset a physical uplink control channel (PUCCH) beam to a PRACH beam. In such aspects, the one or more other conditions may include a threshold number of symbols from a last symbol of a first PDCCH reception where the mobile device (e.g., user equipment (mobile device)) detects a downlink control information (DCI) format with a cyclic redundancy check (CRC) scrambled by a cell radio network temporary identifier (C-RNTI), and the mobile device has received an activation command for PUCCH-SpatialRelationInfo or has received PUCCH-SpatialRelationInfo for one or more PUCCH resources. Some aspects may further include transmitting a PUCCH on a same cell as a PRACH transmission.

Further aspects may include a mobile device having a processor configured to perform one or more operations of any of the methods summarized above. Further aspects may include processing devices for use in a mobile device configured with processor-executable instructions to perform operations of any of the methods summarized above. Further aspects may include a non-transitory processor-readable storage medium having stored thereon processor-executable instructions configured to cause a processor of a mobile device to perform operations of any of the methods summarized above. Further aspects include a mobile device having means for performing functions of any of the methods summarized above. Further aspects include a system on chip for use in a mobile device and that includes a processor configured to perform one or more operations of any of the methods summarized above.

Further aspects include systems and methods for managing beam failure by a base station within a wireless communication network. Some aspects may include receiving from a mobile device a message initiating contention based random access (CBRA) based on contention free random access (CFRA) resources not being configured for the mobile device, determining whether a downlink beam or quasi-colocation (QCL) assumption a downlink resource of a physical random access channel (PRACH) is different from any active downlink beam or QCL assumption, and performing CBRA with the mobile device in response to determining that the downlink beam or QCL assumption a downlink resource of a PRACH is different from any active downlink beam or QCL assumption.

Some aspects may further include receiving a PUCCH message on a same beam as a PRACH transmission. Some aspects may further include resetting a PUCCH beam to a PRACH beam based on one or more PRACH characteristics and on one or more other conditions. In such aspects, the one or more other conditions may include a threshold number of symbols (for example, 28 symbols) from a last symbol of a first PDCCH reception where the mobile device detects a downlink control information (DCI) format with a cyclic redundancy check (CRC) scrambled by a cell radio network temporary identifier (C-RNTI), and transmitting an activation command for PUCCH-SpatialRelationInfo or PUCCH-SpatialRelationInfo for one or more PUCCH resources.

Further aspects may include a base station having a processor configured to perform one or more operations of the base station methods summarized above. Further aspects may include processing devices for use in a base station configured with processor-executable instructions to perform operations of operations of the base station methods summarized above. Further aspects may include a non-transitory processor-readable storage medium having stored thereon processor-executable instructions configured to cause a processing device to perform operations of the base station methods summarized above. Further aspects include a base station having means for performing functions of operations of the base station methods summarized above.

DETAILED DESCRIPTION

Figure 1:
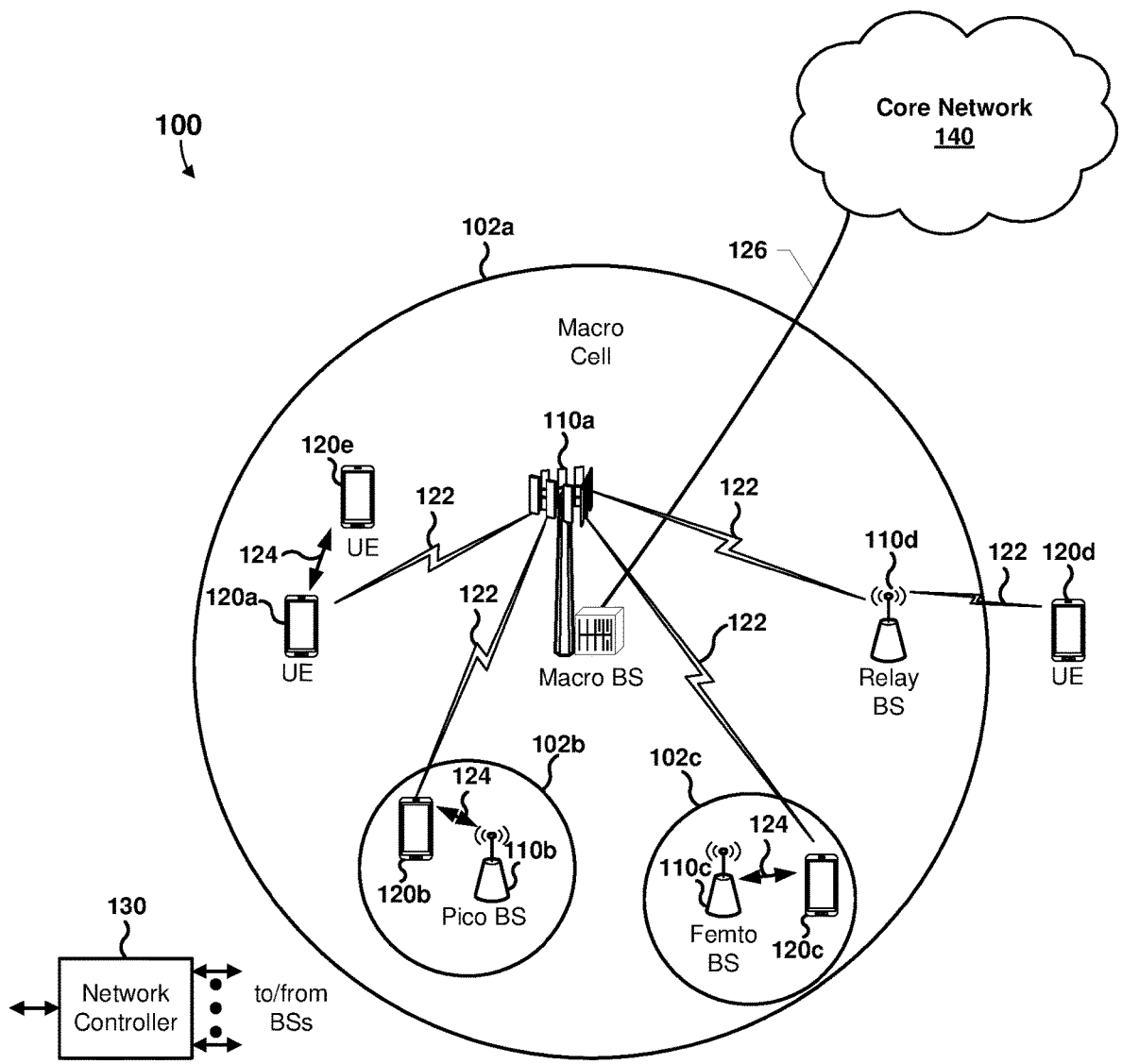
FIG. 1 is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for managing information transmission for wireless communication between devices such as a base station and a mobile device. Various embodiments include systems and methods for managing beam failure recovery (BFR) performed by a processor of a mobile device. Various embodiments may enable a mobile device to initiate a contention based random access channel procedure (CBRA) in case of beam failure in a communication link with a base station. Some aspects may enable a mobile device to initiate CBRA when downlink and/or uplink resources for performing a contention based random access channel procedure (CFRA) are not available to the mobile device.

The term "mobile device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, mobile devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single mobile device. The proximity of the SOCs facilitates high speed communications and the sharing of memory and resources.

NR base stations and mobile devices perform beam management operations to precisely align transmitter and the receiver beams. If a mobile device determines that channel conditions are below a threshold, the mobile device may attempt to initiate a beam failure recovery process with the base station.

For example, in NR, a mobile device and a base station (e.g., a gNodeB) may communicate via a beam (such as a Synchronization Signal Block) having a highest signal strength. In some embodiments, periodically (P), semi-persistently (SP), or aperiodically (AP), the base station may send a P/SP/AP channel state indicator-reference signal (CSI-RS) (e.g., in connected mode) to enable the mobile device to decode beams specified by a transmission configuration indicator (TCI). The mobile device may report to the base station channel conditions such as a received signal strength (for example, a Layer 1-Reference Signal Received Power (L1-RSRP). The mobile device may also report to the base station channel state feedback (CSF) of a serving beam (i.e., the beam currently used for communication between the mobile device and the base station) and one or more neighbor (or candidate) beams.

In some embodiments, if the mobile device determines that a channel condition is below a threshold (for example, L1-RSRP is below a threshold signal strength), the mobile device may initiate a timer (e.g., a T310 timer) for detecting a beam failure. The mobile device may report a detected beam failure to the network using a beam failure detection resource set, which may, in some embodiments, be configured by the network in a radio resource control (RRC) reconfiguration message. The mobile device may search for another candidate beam that may provide superior service to the mobile device. If the mobile device determines that a threshold number of beam failure detections has occurred, the mobile device may attempt to initiate BFR for the candidate beam with the network. The BFR requires the mobile device to report the beam failure to the base station on which it is camped. In some embodiments, the mobile device may initiate BFR by attempting a CFRA process to communicate with the base station. However, communication resources for performing CFRA may not be available to the mobile device in some cases.

Various embodiments enable a mobile device to utilize CBRA to perform BFR. In some embodiments, the mobile device may utilize CBRA to perform BFR in a scenario in which CFRA resources have not been configured for the mobile device.

In CFRA, a base station sends to a mobile device a message indicating a timing and a PRACH preamble that the mobile device should use in a PRACH that the mobile device sends to the base station. The base station typically allocates PRACH preamble(s) to each mobile device in a manner that ensures a PRACH from one mobile device does not collide with a PRACH from another mobile device. Thus, the process is referred to as contention-free. The mobile device may initiate CFRA by sending a PRACH preamble that is indicated by the base station using CFRA resources configured by the base station. In the absence of CFRA resources allocated by the base station (e.g., by a message from the base station allocating CFRA resources) the mobile device may be unable to perform CFRA.

In CBRA, the mobile device selects a PRACH preamble at random from a set of preambles (for example out of 64 preambles defined in each time-frequency in 5G NR). That is, the mobile device may initiate CBRA by sending a PRACH preamble that the mobile device selects. In the case of CBRA, since there is no coordination with the base station of the selected PRACH preamble, there is a possibility that a PRACH from one mobile device will collide with a PRACH from another mobile device if the one mobile device randomly selects a preamble that was either assigned to the other mobile device by a base station or randomly selected by the other base station. For this reason, the CBRA process is referred to as contention-based. In CBRA, it may require more messages to perform a random access procedure (e.g., CBRA may require four messages and may be referred to as four-step RACH) than for CFRA (e.g., CFRA may require only two messages and may be referred to as two-step RACH).

In some embodiments, the mobile device may determine whether a beam failure of a communication link with a base station has occurred and may identify a RACH occasion in response to determining that a beam failure has occurred. In some embodiments, the mobile device may determine whether CFRA resources have been configured. In some embodiments, the mobile device may initiate contention based random access (CBRA) in response to determining that CFRA resources have not been configured.

In some embodiments, determining that CFRA resources have not been configured may include determining that no active downlink beam or quasi-colocation (QCL) assumption is associated with the selected RACH occasion. In some embodiments, determining that no active downlink beam or QCL assumption is associated with the selected RACH occasion may include determining that no activated transmission configuration indicator (TCI) state for one or more of a physical downlink control channel (PDCCH) and a physical downlink shared channel (PDSCH) is associated with the selected RACH occasion.

In some embodiments, determining that no active downlink beam or QCL assumption is associated with the selected RACH occasion may include determining that no activated TCI state of a PDCCH having a CORESET that is monitored for beam failure detection is associated with the selected RACH occasion. In some embodiments, determining that CFRA resources have not been configured may include determining that no active downlink beam or QCL assumption is associated with the selected RACH occasion and that no active uplink beam or spatial relation is associated with the selected RACH occasion. In some embodiments, determining that CFRA resources have not been configured may include determining that no active uplink beam or spatial relation is associated with the selected RACH occasion.

Various embodiments enable a base station to utilize CBRA to perform BFR. In some embodiments, the base station may utilize CBRA to perform BFR in a scenario in which CFRA resources have not been configured for the mobile device. Various embodiments may include receiving from a mobile device a message initiating CBRA based on CFRA resources not being configured for the mobile device, and performing one or more CBRA operations responsive to the message from the mobile device initiating CBRA. In some embodiments, performing by the base station one or more CBRA operations responsive to the message from the mobile device initiating CBRA may include sending to the mobile device a random access response message.

In some embodiments, a base station and a mobile device may utilize CBRA to perform BFR. In some embodiments, in a first option, a downlink beam or QCL assumption for a DL RS that is mapped to a selected RACH occasion is different from any active downlink beam or QCL assumption. In some embodiments, this condition may imply that one or more active downlink transmit-receive beam pairs have failed. In a first sub-option, a DL RS for PRACH association may include a QCL assumption that is different from that in any activated TCI state for a PDCCH and/or a PDSCH. In some embodiments, an active DL beam or QCL assumption may include any activated TCI state for both PDCCH and PDSCH. In a second sub-option, a DL RS for PRACH association may include a QCL assumption that is different from that in any activated TCI state for PDCCH. In some embodiments, an active DL beam or QCL assumption may include any activated TCI state for PDCCH only. In a third sub-option, a DL RS for PRACH association may include a QCL assumption that is different from that in any activated TCI state for PDCCH monitored for beam failure detection. In some embodiments, an active DL beam or QCL assumption may include any activated TCI state for PDCCH whose CORESET is monitored for beam failure detection.

In some embodiments, in a second option, a downlink beam or QCL assumption for the DL RS mapped to the RACH occasion and/or the UL beam or spatial relation for PRACH may be different from any active DL beam or QCL assumption and/or any active UL beam or spatial relation. In some embodiments, this condition may imply that all active downlink transmit-receive beam pairs and/or all active uplink transmit-receive beam pairs have failed.

In some embodiments, in a third option, an uplink beam or spatial relation for a PRACH may be different from any active uplink beam or spatial relation. In some embodiments, this condition may imply that all active uplink transmit-receive beam pairs have failed Various embodiments improve the operations of a mobile device, a base station, and a communication network by enabling the mobile device and the base station to manage performance of the BFR procedure to maintain communications even when CFRA resources have not been configured for the mobile device. Thus, various embodiments improve the operations of a mobile device, a base station, and a communication network by improving the quality and efficiency of communication operations of the mobile device, the base station, and the communication network.

FIG. 1 shows a system block diagram illustrating an example communications system. The communications system 100 may be a 5G New Radio (NR) network, or any other suitable network such as a Long Term Evolution (LTE) network.

The communications system 100 may include a heterogeneous network architecture that includes a core network 140 and a variety of mobile devices (illustrated as mobile device 120a-120e in FIG. 1). The communications system 100 also may include a number of base stations (illustrated as the BS 110a, the BS 110b, the BS 110c, and the BS 110d) and other network entities. A base station is an entity that communicates with mobile devices (mobile devices), and also may be referred to as a Computing platformB, a Computing platform B, an LTE evolved computing platformB (eNB), an access point (AP), a radio head, a transmit receive point (TRP), a New Radio base station (NR BS), a 5G Computing platformB (NB), a Next Generation Computing platformB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "computing platform B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network computing platforms (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The mobile device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a mobile device) and send a transmission of the data to a downstream station (for example, a mobile device or a base station). A relay station also may be a mobile device that can relay transmissions for other mobile devices. In the example illustrated in FIG. 1, a relay station 110d may communicate with macro the base station 110a and the mobile device 120d in order to facilitate communication between the base station 110a and the mobile device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The mobile devices 120a, 120b, 120c may be dispersed throughout communications system 100, and each mobile device may be stationary or mobile. A mobile device also may be referred to as an access terminal, a terminal, a mobile station, a subscriber unit, a station, etc.

A macro base station 110a may communicate with the communication network 140 over a wired or wireless communication link 126. The mobile devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per mobile device. Multi-layer transmissions with up to 2 streams per mobile device may be supported.

Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. The mobile device 120a-120e may be included inside a housing that houses components of the mobile device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices (for example, illustrated as the mobile device 120a and the mobile device 120e) may communicate directly using one or more sidelink channels (for example, without using a base station 110a-d as an intermediary to communicate with one another). For example, the mobile devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the mobile device 120a-120e may perform scheduling operations, resource selection operations, as well as other operations described elsewhere herein as being performed by the base station 110a-110d.

Figure 2:
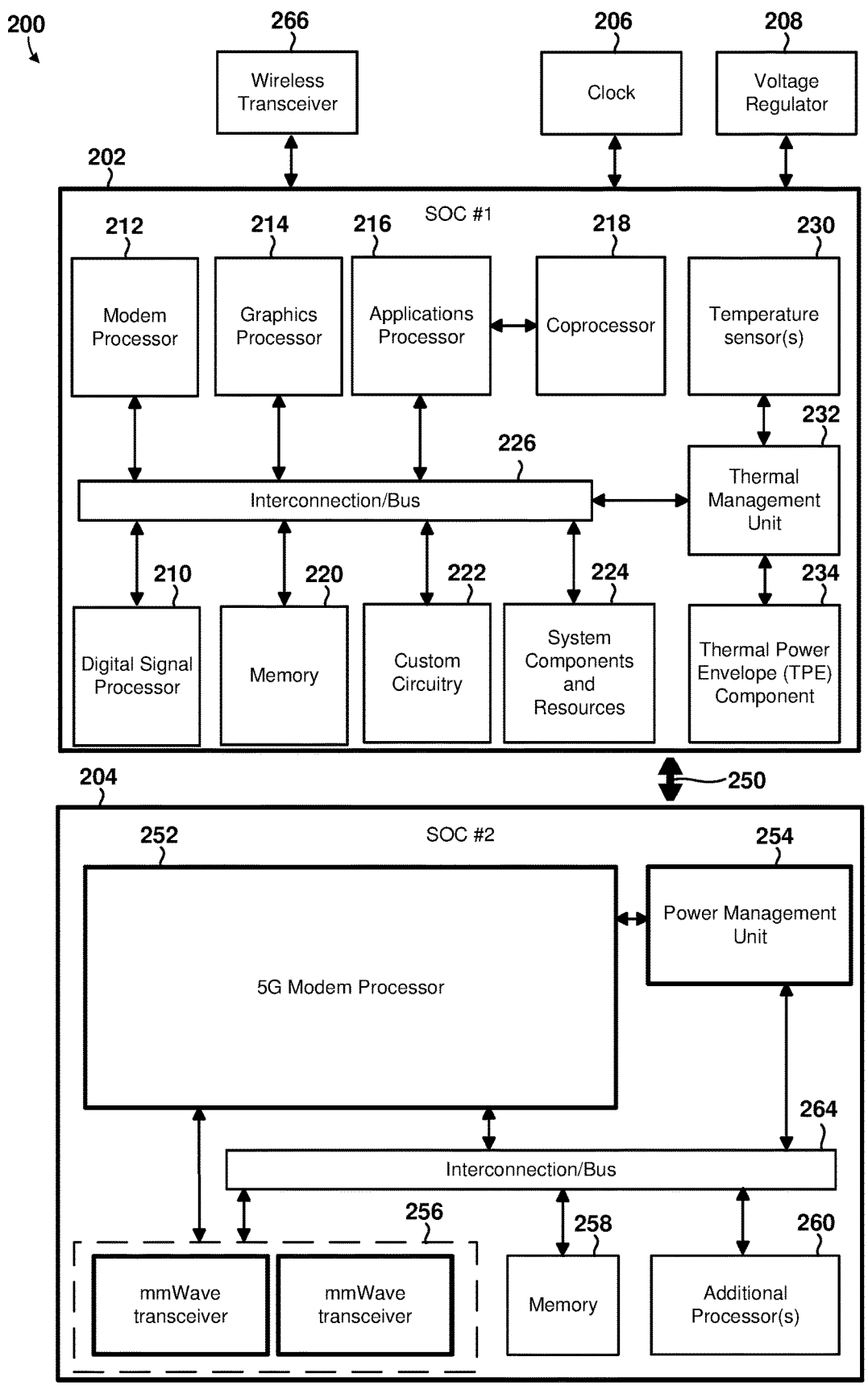
FIG. 2 is a component block diagram illustrating an example computing system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some implementations, the first SOC 202 may operate as central processing unit (CPU) of the mobile device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a mobile device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
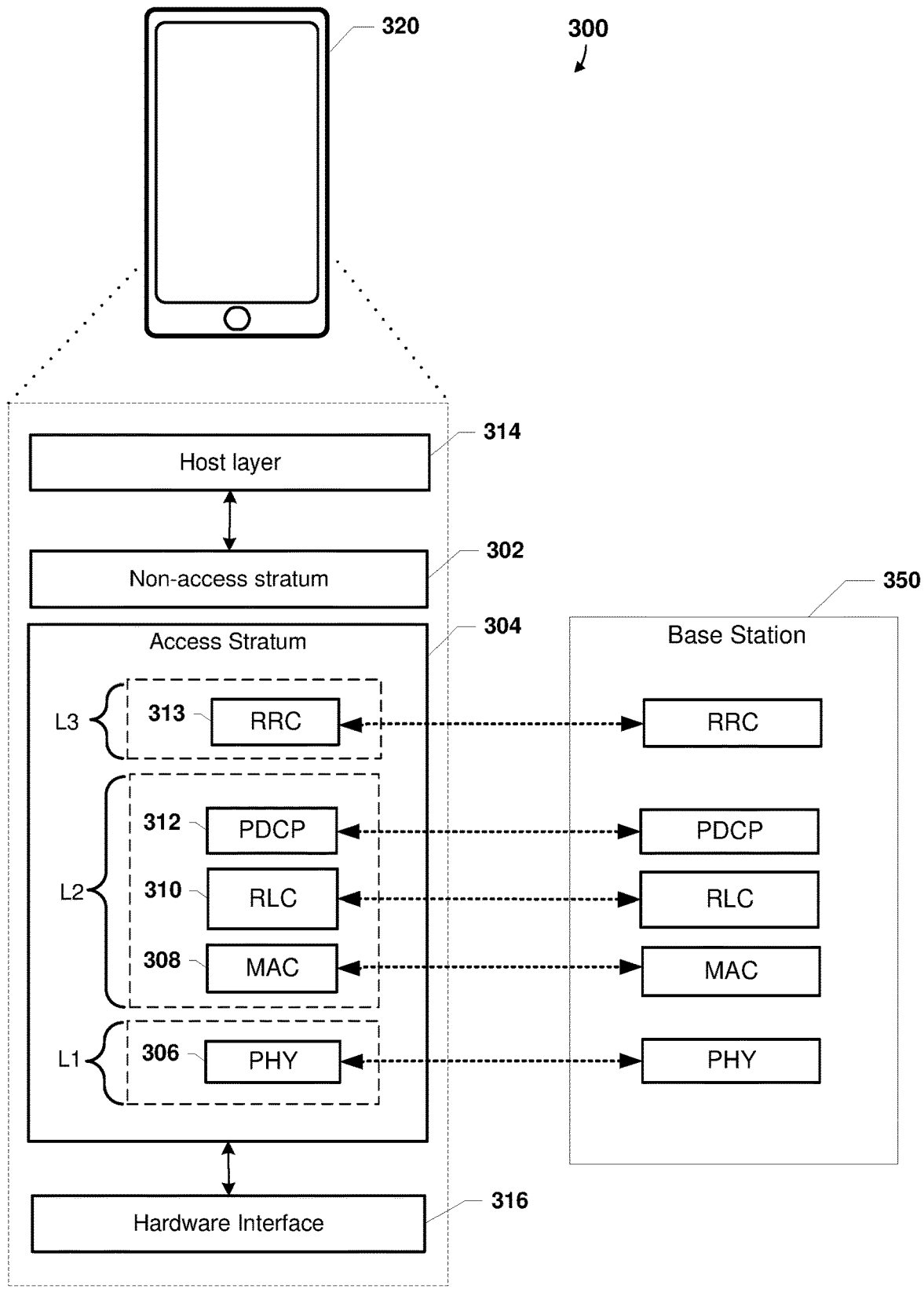
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the mobile device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the mobile device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions INCLUDING broadcasting system information, paging, and establishing and releasing an RRC signaling connection between the mobile device 320 and the base station 350.

In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the mobile device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as the Internet Protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4A:
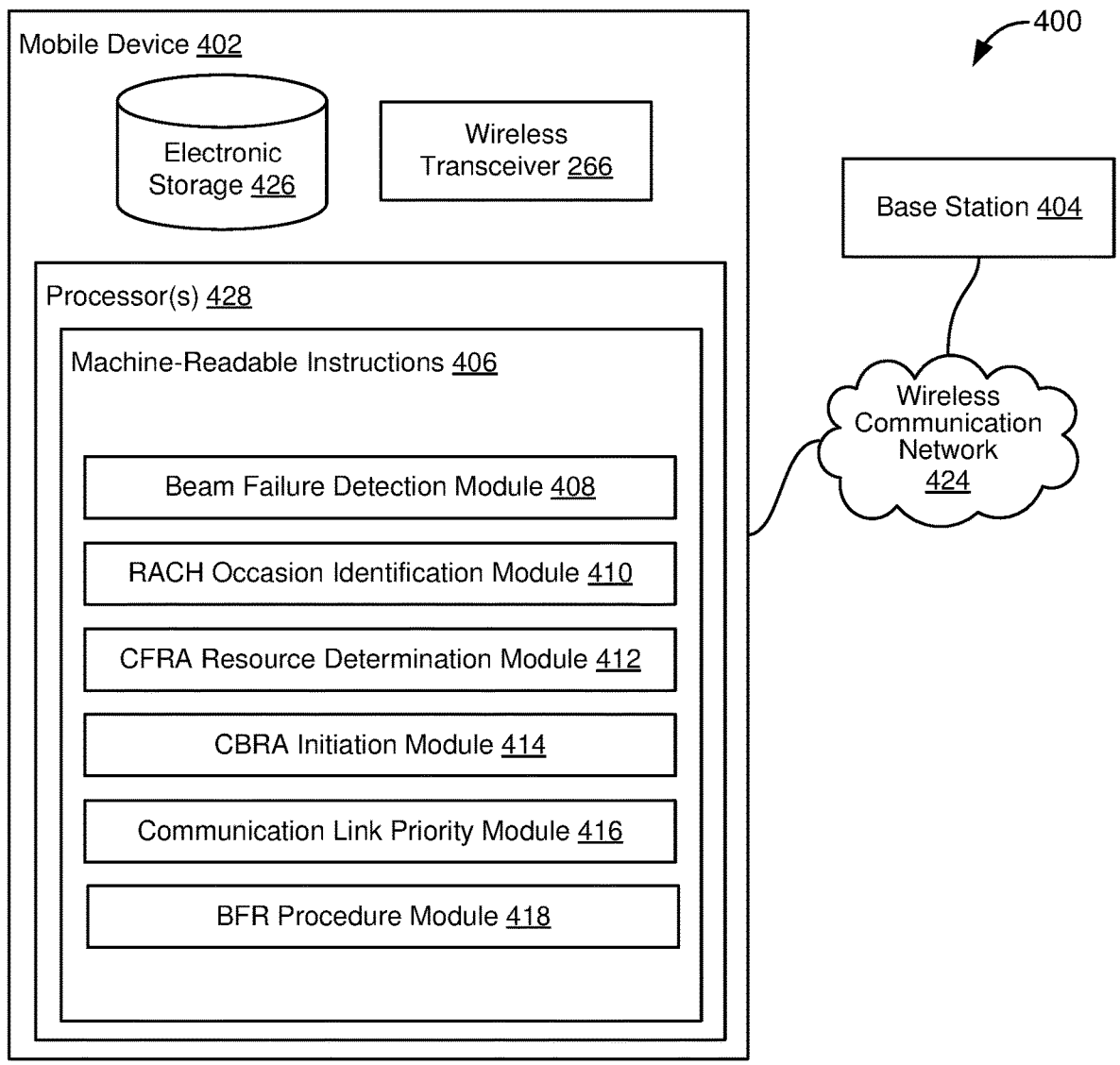
FIGS. 4A and 4B are component block diagrams illustrating a system configured for managing beam failure recovery in accordance with various embodiments.
Figure 4B:
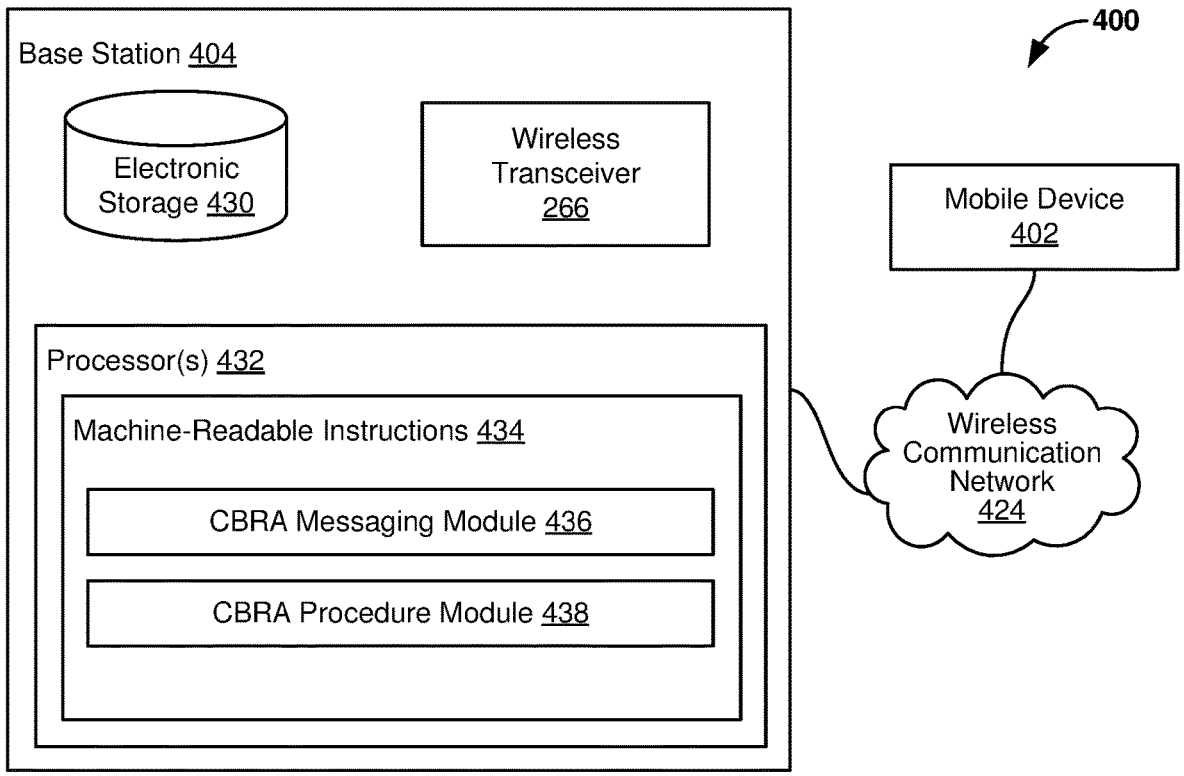

FIGS. 4A and 4B are component block diagrams illustrating a system 400 configured for managing beam failure recovery in accordance with various embodiments. With reference to FIGS. 1-4B, system 400 may include a mobile device 402 (e.g., 120a-120e, 200, 320) and a base station 404 (e.g., 120a-120e, 200, 320). The mobile device 402 and the base station 404 may communicate over a wireless communication network 424 (aspects of which are illustrated in FIG. 1).

The mobile device 402 may include one or more processors 428 coupled to electronic storage 426 and a wireless transceiver (e.g., 266). The wireless transceiver 266 may be configured to receive messages to be sent in uplink transmissions from the processor(s) 428, and to transmit such messages via an antenna (not shown) to a wireless communication network 424 for relay to the base station 404. Similarly, the wireless transceiver 266 may be configured to receive messages from base station 404 in downlink transmissions from the wireless communication network 424 and pass the messages (e.g., via a modem (e.g., 252) that demodulates the messages) to the one or more processors 428.

The processor(s) 428 may be configured by machine-readable instructions 406. Machine-readable instructions 406 may include one or more instruction modules. The instruction modules may include computer program modules. The instruction modules may include one or more of a beam failure detection module 408, a RACH occasion identification module 410, a CFRA resource determination module 412, a CBRA initiation module, or other instruction modules.

The beam failure detection module 408 may be configured to detect a beam failure of a communication link with a base station, or to determine whether a beam failure of a communication link with a base station has occurred.

The RACH occasion identification module 410 may be configured to identify a RACH occasion. In some embodiments, the RACH occasion identification module 410 may be configured to identify a RACH occasion in response to determining that a beam failure has occurred.

The CFRA resource determination module 412 may be configured to determine whether CFRA resources have been configured, e.g., for the mobile device 402. The CFRA resource determination module 412 may be configured to determine that no active downlink beam or QCL assumption is associated with the selected RACH occasion. The CFRA resource determination module 412 may be configured to determine that no activated transmission configuration indicator (TCI) state for one or more of a physical downlink control channel (PDCCH) and a physical downlink shared channel (PDSCH) is associated with the selected RACH occasion. The CFRA resource determination module 412 may be configured to determine that no activated TCI state of a PDCCH having a CORESET that is monitored for beam failure detection is associated with the selected RACH occasion. The CFRA resource determination module 412 may be configured to determine that no active downlink beam or QCL assumption is associated with the selected RACH occasion and that no active uplink beam or spatial relation is associated with the selected RACH occasion. The CFRA resource determination module 412 may be configured to determine that no active uplink beam or spatial relation is associated with the selected RACH occasion.

The CBRA initiation module 414 may be configured to initiate CBRA in response to determining that CFRA resources have not been configured.

The base station 404 may include one or more processors 432 coupled to electronic storage 430 and a wireless transceiver (e.g., 266). The wireless transceiver 266 may be configured to receive messages to be sent in uplink transmissions from the processor(s) 432, and to transmit such messages via an antenna (not shown) to a wireless communication network 424 for relay to the wireless device 402. Similarly, the wireless transceiver 266 may be configured to receive messages from the wireless device 402 in downlink transmissions from the wireless communication network 424 and pass the messages (e.g., via a modem (e.g., 252) that demodulates the messages) to the one or more processors 432.

The processor(s) 432 may be configured by machine-readable instructions 434. Machine-readable instructions 406 may include one or more instruction modules. The instruction modules may include computer program modules. The instruction modules may include one or more of a CBRA messaging module 436, a CBRA procedure module 438, or other instruction modules.

The CBRA messaging module 436 may be configured to receive from the mobile device 402 a message initiating CBRA based on CFRA resources not being configured for the mobile device.

The CBRA procedure module 438 may be configured to perform one or more CBRA operations responsive to the message from the mobile device initiating CBRA. In some embodiments, the CBRA procedure module 438 may be configured to send to the mobile device a random access response (RAR) message.

In some implementations, the mobile device 402 and the base station 404 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which the mobile device 402 and the base station 404 may be operatively linked via some other communication media.

The electronic storage 426, 430 may include non-transitory storage media that electronically stores information. The storage media of the electronic storage 426, 430 may include one or both of system storage that is provided integrally (i.e., substantially non-removable) with mobile device 402 or base station 404 and/or removable storage that is removably connectable to mobile device 402 or base station 404 via, for example, a port (e.g., a universal serial bus (USB) port, a firewire port, etc.) or a drive (e.g., a disk drive, etc.). The electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). The electronic storage 426, 430 may store software algorithms, information determined by processor(s) 420, 432, information received from the mobile device 402 or the base station 404, or other information that enables the mobile device 402 or the base station 404 to function as described herein.

Processor(s) 428, 432 may be configured to provide information processing capabilities in the mobile device 402 and the base station 404. As such, processor(s) 428, 432 may include one or more of a digital processor, an analog processor, a digital circuit designed to process information, an analog circuit designed to process information, a state machine, and/or other mechanisms for electronically processing information. Although processor(s) 428, 432 are illustrated as single entities, this is for illustrative purposes only. In some implementations, processor(s) 428, 432 may include a plurality of processing units and/or processor cores. The processing units may be physically located within the same device, or processor(s) 428, 432 may represent processing functionality of a plurality of devices operating in coordination. Processor(s) 428, 432 may be configured to execute modules 408-418, 436, 438, and/or other modules. Processor(s) 428, 432 may be configured to execute modules 408-418, 436, 438, and/or other modules by software; hardware; firmware; some combination of software, hardware, and/or firmware; and/or other mechanisms for configuring processing capabilities on the processor(s) 428, 432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-418, 436, and 438 described below is for illustrative purposes, and is not intended to be limiting, as any of modules 408-418, 436, and 438 440 may provide more or less functionality than is described. For example, one or more of the modules 408-418, 436, and 438 may be eliminated, and some or all of its functionality may be provided by other modules 408-418, 436, and 438. As another example, the processor(s) 428, 432 may be configured to execute one or more additional modules that may perform some or all of the functionality attributed below to one of the modules 408-418, 436, and 438.

Figure 5:
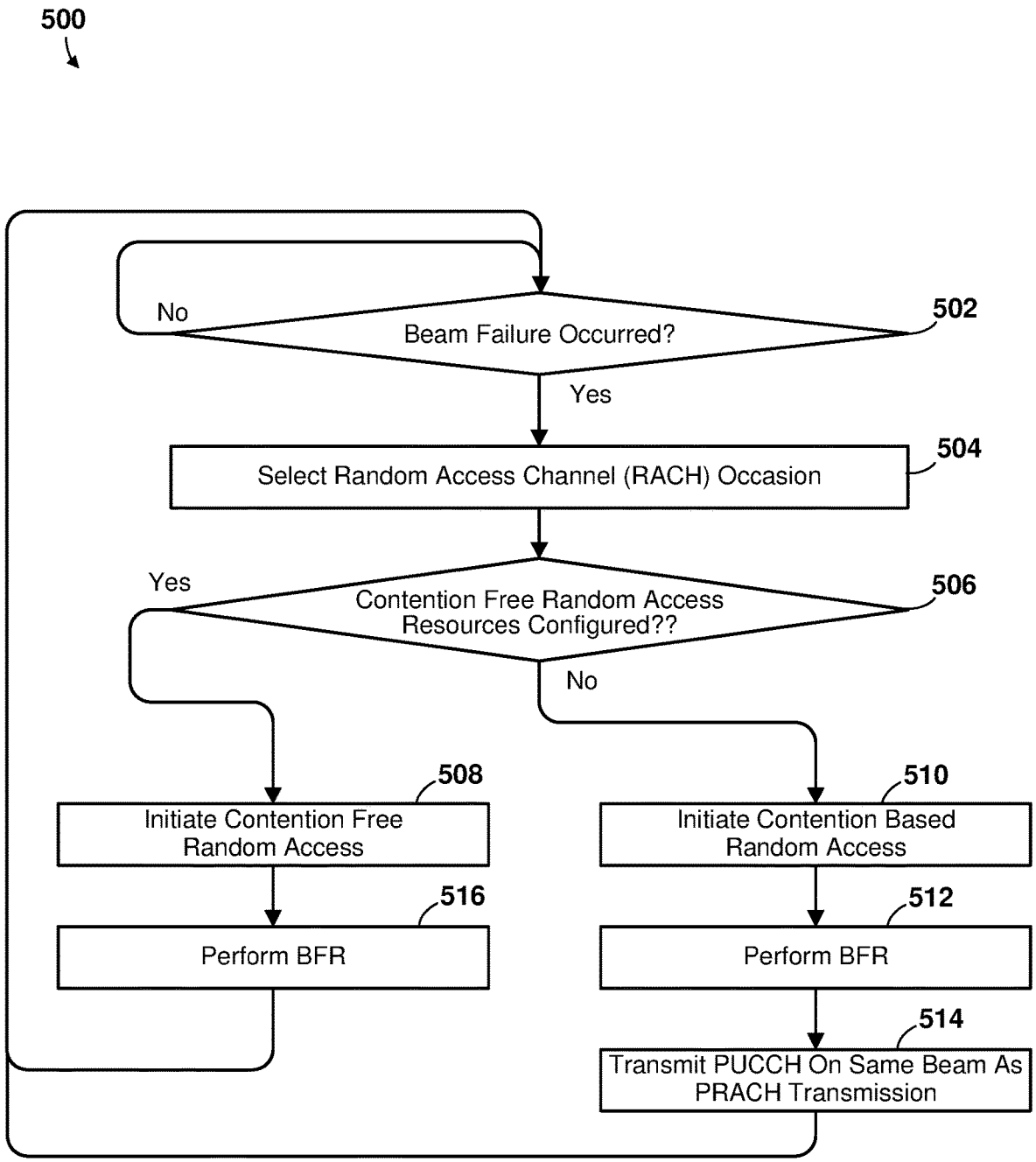
FIG. 5 is a process flow diagram illustrating a method that may be performed by a processor of a mobile device for managing beam failure recovery in accordance with various embodiments.

FIG. 5 is a process flow diagram illustrating a method 500 that may be performed by a processor of a mobile device for managing beam failure recovery in accordance with various embodiments. With reference to FIGS. 1-5, the operations of the method 500 may be performed by a processor (such as the processor 210, 212, 214, 216, 218, 252, 260, 428) of a mobile device (such as the mobile device 120a-120e, 200, 320, 402).

In determination block 502, the processor may determine whether a beam failure of a communication link with a base station has occurred. Means for performing the operations of determination block 502 may include the processor (e.g., 210, 212, 214, 216, 218, 252, 260, 428) coupled to a wireless transceiver (e.g., 266).

In response to determining that the beam failure has not occurred (i.e., determination block 502="No"), the processor may repeat the operations of determination block 502.

In response to determining that the beam failure has occurred (i.e., determination block 502="Yes"), the processor may identify a random access channel (RACH) occasion in response to determining that the beam failure has occurred in block 504. For example, the processor may determine that a channel condition (such as an RSRP) is below a threshold (such as a signal strength threshold). Means for performing the operations of determination block 504 may include the processor (e.g., 210, 212, 214, 216, 218, 252, 260, 428) coupled to a wireless transceiver (e.g., 266).

In determination block 506, the processor may determine whether contention free random access (CFRA) resources have been configured. In some embodiments, the processor may determine whether a downlink beam has been mapped to the selected RACH occasion. In some embodiments, the processor may determine whether a quasi-colocation (QCL) assumption has been mapped to the selected RACH occasion. For example, two antenna ports may be said to be quasi-collocated if properties of the channel over which a symbol on one antenna port is conveyed can be inferred from the channel over which a symbol on the other antenna port is conveyed. In some embodiments, a QCL assumption may be transmitted by a base station to a mobile device via a downlink control information (DCI). In some embodiments, the processor may determine whether a downlink reference signal (DL RS) mapped to the selected RACH occasion (or Physical RACH (PRACH) occasion) is different from any active downlink beam or QCL assumption. Means for performing the operations of determination block 506 may include the processor (e.g., 210, 212, 214, 216, 218, 252, 260, 428) coupled to a wireless transceiver (e.g., 266).

In response to determining that CFRA resources have been configured (i.e., determination block 506="Yes"), the processor may initiate CFRA in block 508. For example, the mobile device may initiate CFRA by sending a PRACH preamble that is indicated by the base station using CFRA resources configured by the base station. Means for performing the operations of determination block 508 may include the processor (e.g., 210, 212, 214, 216, 218, 252, 260, 428) coupled to a wireless transceiver (e.g., 266).

In block 516, the processor may perform one or more beam failure recovery operations. Means for performing the operations of determination block 510 may include the processor (e.g., 210, 212, 214, 216, 218, 252, 260, 428) coupled to a wireless transceiver (e.g., 266).

In response to determining that CFRA resources have not been configured (i.e., determination block 506="No"), the processor may initiate CBRA in block 510. In some embodiments, initiating CBRA may include performing one or more operations to begin a CBRA procedure. In some embodiments, initiating CBRA may include sending to the base station a PRACH transmission, such as random access preamble or another suitable message. In some embodiments, the mobile device may initiate CBRA by sending a PRACH preamble that the mobile device selects at random from a set of preambles. Means for performing the operations of determination block 510 may include the processor (e.g., 210, 212, 214, 216, 218, 252, 260, 428) coupled to a wireless transceiver (e.g., 266).

In block 512, the processor may perform one or more beam failure recovery operations. Means for performing the operations of determination block 510 may include the processor (e.g., 210, 212, 214, 216, 218, 252, 260, 428) coupled to a wireless transceiver (e.g., 266).

In block 514, the processor may transmit a PUCCH on a same cell as a PRACH transmission. In some embodiments, the processor may determine based on one or more PRACH characteristics and on one or more other conditions to reset the PUCCH beam to a PRACH beam. In some embodiments, the processor may transmit the PUCCH on the same cell as a PRACH transmission after a successful completion of CBRA beam failure recovery. In some embodiments, the processor may transmit the PUCCH to a Primary Cell (PCell) or a Primary Secondary Cell (PSCell). In some embodiments, for the PCell or the PSCell, after successful completion of contention based random access procedure for beam failure recovery, after a threshold number of symbols (e.g., 28 symbols) from a last symbol of a first PDCCH reception where the mobile device detects a DCI format with CRC scrambled by C-RNTI and until the mobile device receives an activation command for PUCCH-SpatialRelationInfo or is provided PUCCH-SpatialRelationInfo for one or more PUCCH resources, the mobile device may transmit a PUCCH on a same cell as the PRACH transmission using one or more of a same spatial filter as for the last PRACH transmission and a determined power. In some embodiments, the power may be determined based on one or more parameters, including, for example, q_u=0, qd=q_newCBRA, I=0, where q_newCBRA is the SS/PBCH block index provided by higher layers.

Following the operations of blocks 514 or 516, the processor may again perform the operations of determination block 502 as described.

FIGS. 6-10 are process flow diagrams illustrating operations 600-1000 that may be performed by a processor of a mobile device as part of the method 500 for managing beam failure recovery in accordance with various embodiments. With reference to FIGS. 1-10, the operations 600-1000 may be performed by a processor of a mobile device (such as the mobile device 120a-120e, 200, 320, 402).

Figure 6:
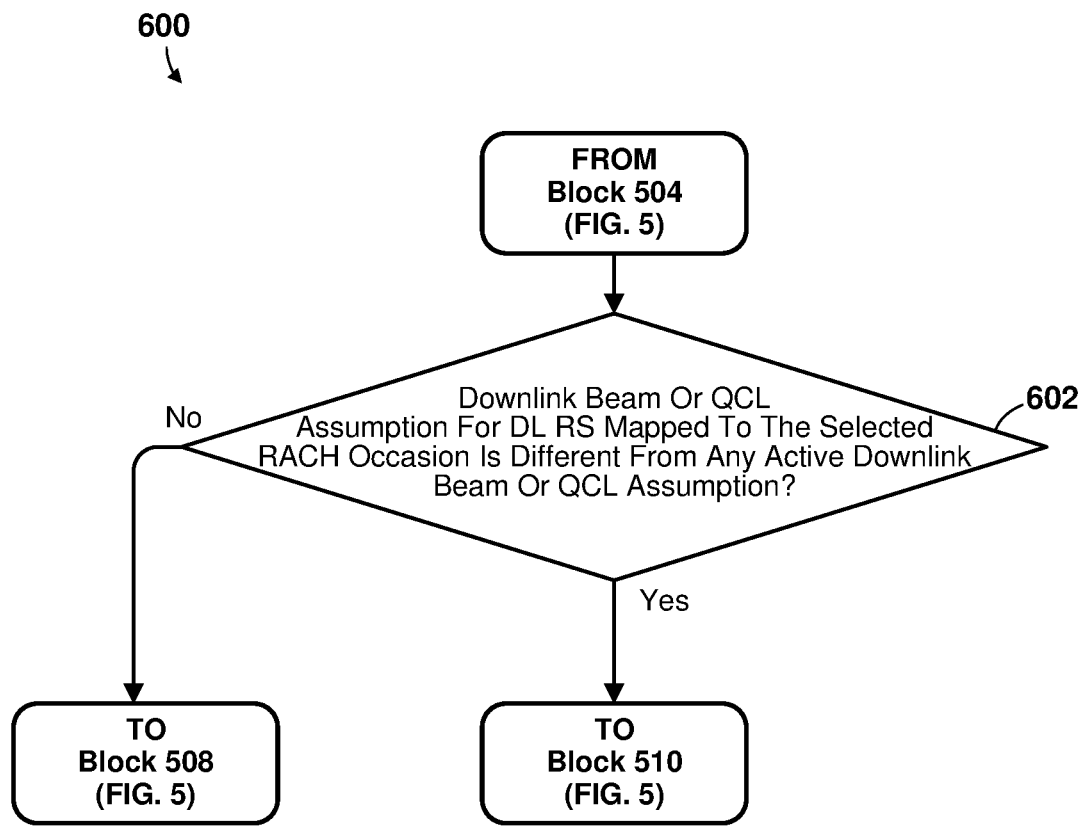
FIGS. 6-10 are process flow diagrams illustrating operations that may be performed by a processor of a mobile device as part of a method for managing beam failure recovery in accordance with various embodiments.

Referring to FIG. 6, after performing the operations of block 504 (FIG. 5), the processor may determine whether a downlink beam or quasi-colocation (QCL) assumption for a downlink reference signal (DL RS) that is mapped to the selected RACH occasion is different from any active downlink beam or quasi-colocation (QCL) assumption in determination block 602. Means for performing the operations of determination block 602 may include the processor (e.g., 210, 212, 214, 216, 218, 252, 260, 428) coupled to a wireless transceiver (e.g., 266).

In response to determining that a downlink beam or QCL assumption for a DL RS that is mapped to the selected RACH occasion is not different from any active downlink beam or quasi-colocation (QCL) assumption (i.e., determination block 602="No"), the processor may perform the operations of block 508 (i.e., initiate CFRA) as described with reference to FIG. 5.

In response to determining that a downlink beam or QCL assumption for a DL RS that is mapped to the selected RACH occasion is different from any active downlink beam or quasi-colocation (QCL) assumption (i.e., determination block 602="Yes"), the processor may perform the operations of block 510 (i.e., initiate CBRA) as described with reference to FIG. 5. In some embodiments, such determination by the processor may imply that all active downlink transmit and receive (Tx/Rx) beam pairs have failed (e.g., that a block error rate (BLER) of all active downlink Tx/Rx beam pairs exceeds a BLER threshold).

Figure 7:
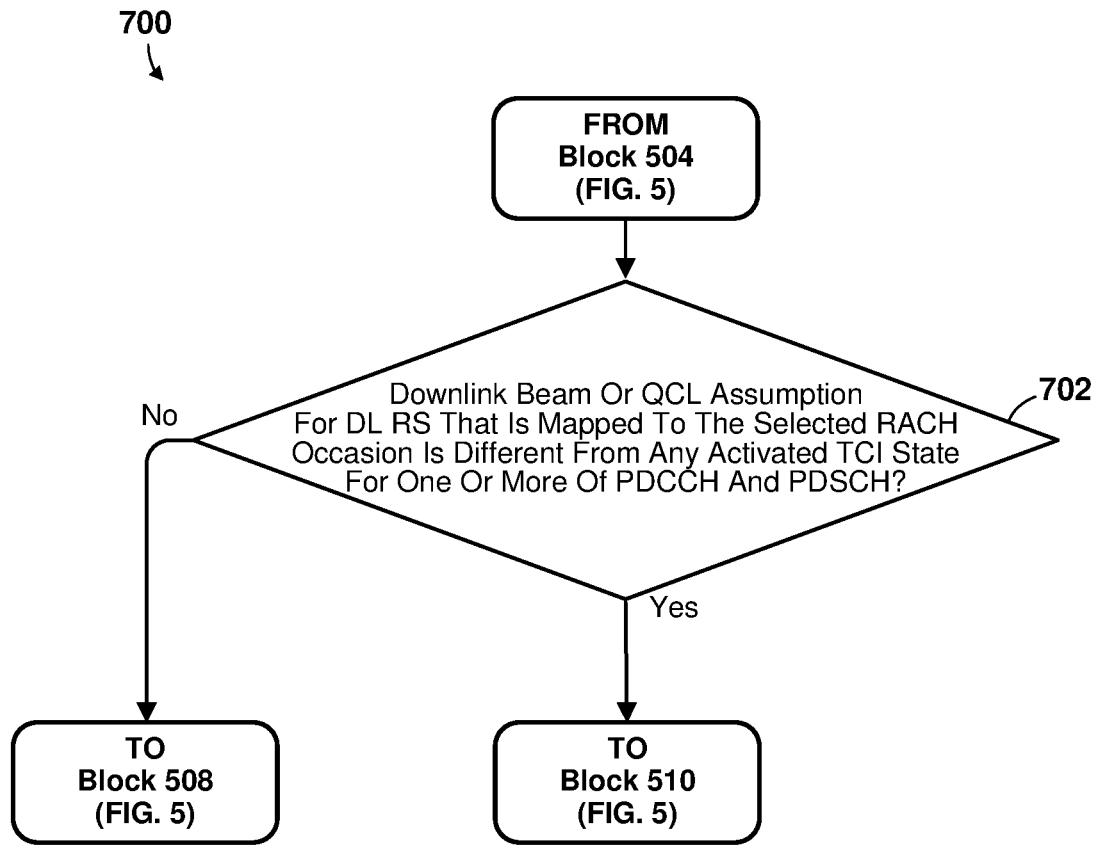

Referring to FIG. 7, after performing the operations of block 504 (FIG. 5), the processor may determine whether the downlink beam or QCL assumption for a DL RS that is mapped to the selected RACH occasion is different from any activated transmission configuration indicator (TCI) state for one or more of a physical downlink control channel (PDCCH) and a physical downlink shared channel (PDSCH) in determination block 702. In some embodiments, one or more TCI states may be sent from the base station to the mobile device via a DCI message that may include configurations such as QCL relationships between downlink reference signal(s) (DL RS) in a channel state indicator reference signal (CSI-RS) set and one or more PDSCH demodulation reference signal (DMRS) ports. In some embodiments, a TCI state may include parameters for configuring a quasi-colocation relationship between one or two downlink reference signals and the DMRS ports of the PDSCH, the DMRS port of the PDCCH or the CSI-RS port(s) of a CSI-RS resource. Means for performing the operations of determination block 702 may include the processor (e.g., 210, 212, 214, 216, 218, 252, 260, 428) coupled to a wireless transceiver (e.g., 266).

In response to determining that the downlink beam or QCL assumption for a DL RS that is mapped to the selected RACH occasion is not different from any activated TCI state for one or more of the PDCCH and the PDSCH (i.e., determination block 702="No"), the processor may perform the operations of block 508 (i.e., initiate CFRA) as described with reference to FIG. 5.

In response to determining that the downlink beam or QCL assumption for a DL RS that is mapped to the selected RACH occasion is different from any activated TCI state for one or more of the PDCCH and the PDSCH (i.e., determination block 702="Yes"), the processor may perform the operations of block 510 (i.e., initiate CBRA) as described with reference to FIG. 5.

Figure 8:
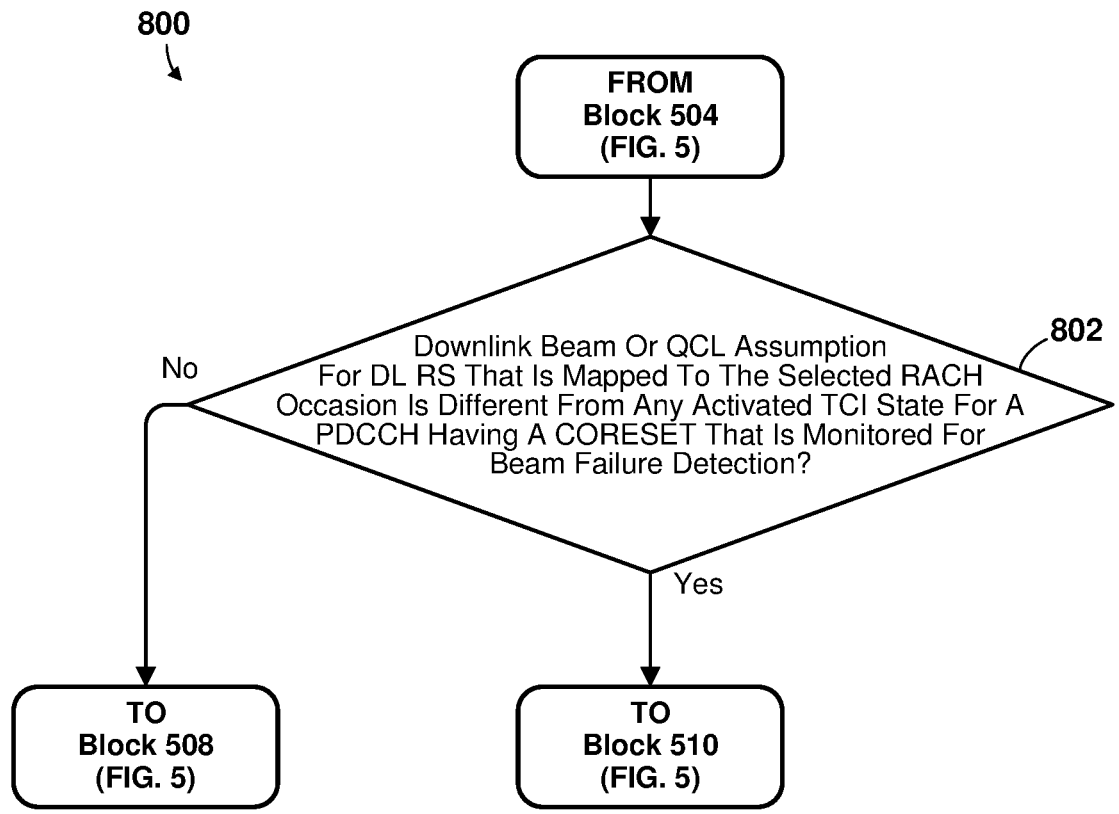

Referring to FIG. 8, after performing the operations of block 504 (FIG. 5), the processor may determine whether a downlink beam or QCL assumption for a DL RS that is mapped to the selected RACH occasion is different from any activated TCI state for a PDCCH having a control resource set (CORESET) that is monitored for beam failure detection in determination block 802. Means for performing the operations of determination block 802 may include the processor (e.g., 210, 212, 214, 216, 218, 252, 260, 428) coupled to a wireless transceiver (e.g., 266).

In response to determining that the downlink beam or QCL assumption for a DL RS that is mapped to the selected RACH occasion is not different from any activated TCI state for a PDCCH having a control resource set (CORESET) that is monitored for beam failure detection (i.e., determination block 802="No"), the processor may perform the operations of block 508 (i.e., initiate CFRA) as described with reference to FIG. 5.

In response to determining that the downlink beam or QCL assumption for a DL RS that is mapped to the selected RACH occasion is different from any activated TCI state for a PDCCH having a control resource set (i.e., determination block 802="Yes"), the processor may perform the operations of block 510 (i.e., initiate CBRA) as described with reference to FIG. 5.

Figure 9:
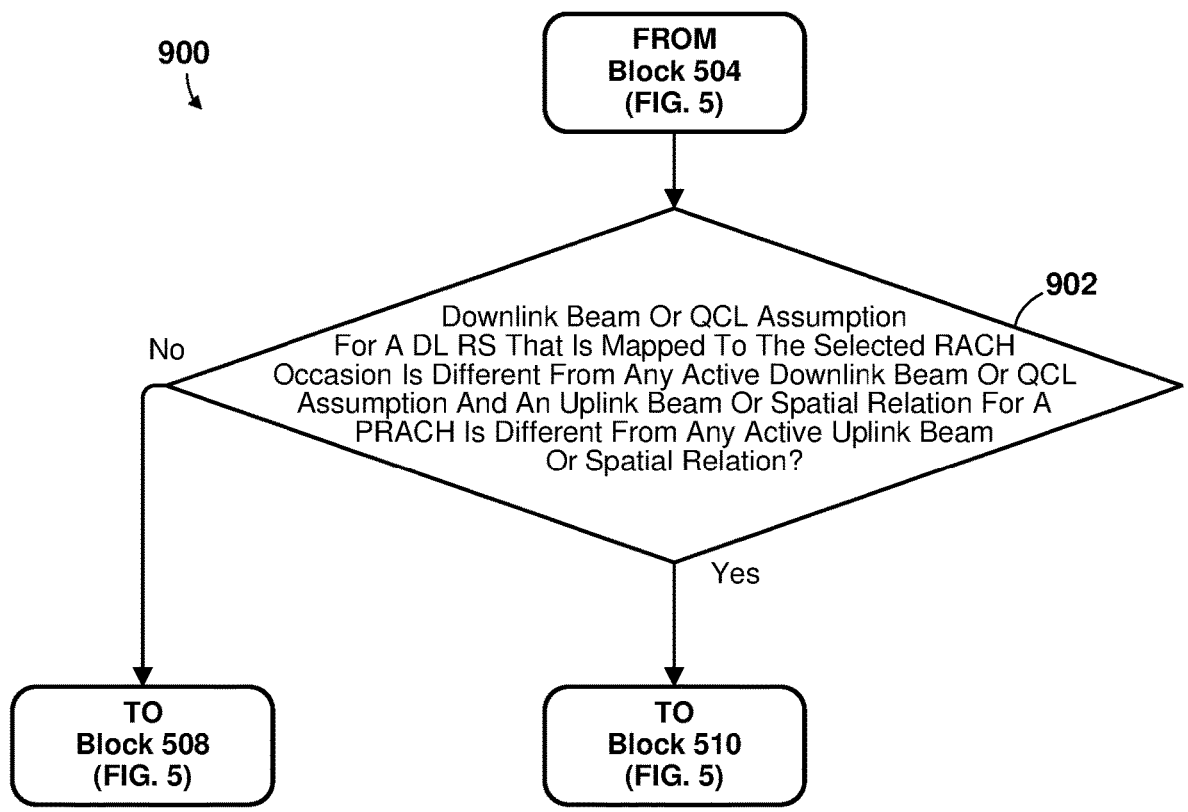

Referring to FIG. 9, after performing the operations of block 504 (FIG. 5), the processor may determine whether a downlink beam or QCL assumption for a DL RS that is mapped to the selected RACH occasion is different from any active downlink beam or QCL assumption and an uplink beam or spatial relation for a PRACH is different from any active uplink beam or spatial relation in determination block 902. In some embodiments, one or more PUCCH resource sets may be configured with a set of candidate spatial relation signals by, for example, a radio resource control (RRC) message from a base station. Means for performing the operations of determination block 902 may include the processor (e.g., 210, 212, 214, 216, 218, 252, 260, 428) coupled to a wireless transceiver (e.g., 266).

In response to determining that the downlink beam or QCL assumption for a DL RS that is mapped to the selected RACH occasion is not different from any active downlink beam or QCL assumption and an uplink beam or spatial relation for a PRACH is different from any active uplink beam or spatial relation (i.e., determination block 902="No"), the processor may perform the operations of block 508 (i.e., initiate CFRA) as described with reference to FIG. 5.

In response to determining that the downlink beam or QCL assumption for a DL RS that is mapped to the selected RACH occasion is different from any active downlink beam or QCL assumption and an uplink beam or spatial relation for a PRACH is different from any active uplink beam or spatial relation (i.e., determination block 902="Yes"), the processor may perform the operations of block 510 (i.e., initiate CBRA) as described with reference to FIG. 5. In some embodiments, such determination by the processor may imply that all active downlink and uplink transmit and receive (Tx/Rx) beam pairs have failed (e.g., that a block error rate (BLER) of all active downlink and uplink Tx/Rx beam pairs exceeds a BLER threshold).

Figure 10:
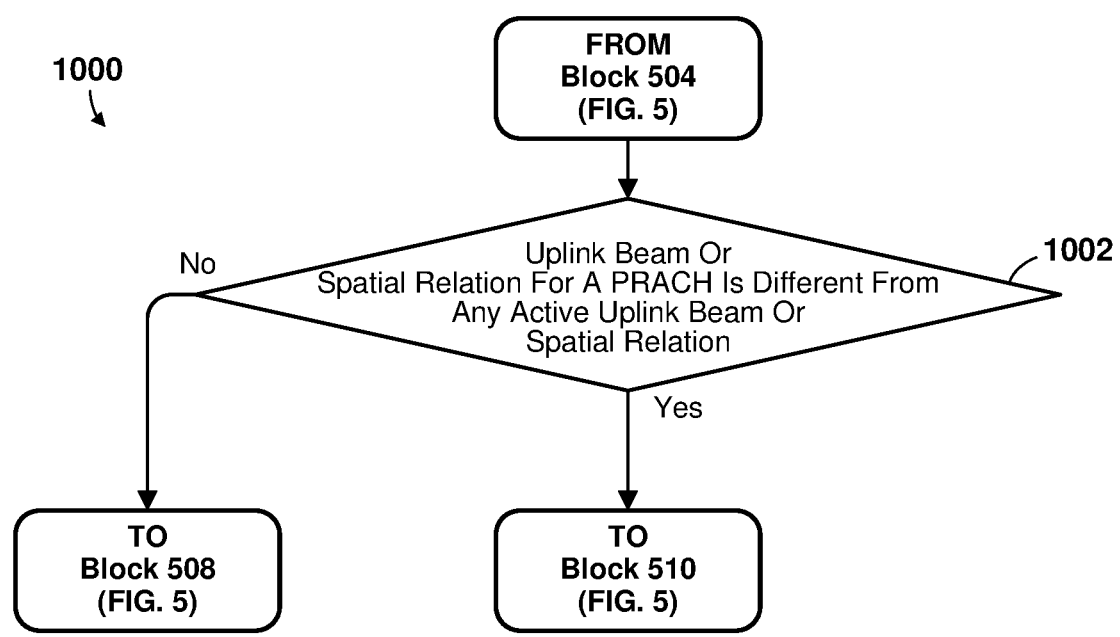

Referring to FIG. 10, after performing the operations of block 504 (FIG. 5), the processor may determine whether an uplink beam or spatial relation for a PRACH is different from any active uplink beam or spatial relation in determination block 1002. In some embodiments, the processor may perform the operations of determination block 1002 without regard to whether an active downlink beam or QCL assumption is associated with the selected RACH occasion.

In response to determining that the uplink beam or spatial relation for a PRACH is not different from any active uplink beam or spatial relation (i.e., determination block 1002="No"), the processor may perform the operations of block 508 (i.e., initiate CFRA) as described with reference to FIG. 5.

In response to determining that the uplink beam or spatial relation for a PRACH is different from any active uplink beam or spatial relation (i.e., determination block 1002="Yes"), the processor may perform the operations of block 510 (i.e., initiate CBRA) as described with reference to FIG. 5. In some embodiments, such determination by the processor may imply that all active uplink transmit and receive (Tx/Rx) beam pairs have failed (e.g., that a block error rate (BLER) of all active uplink Tx/Rx beam pairs exceeds a BLER threshold).

Figure 11:
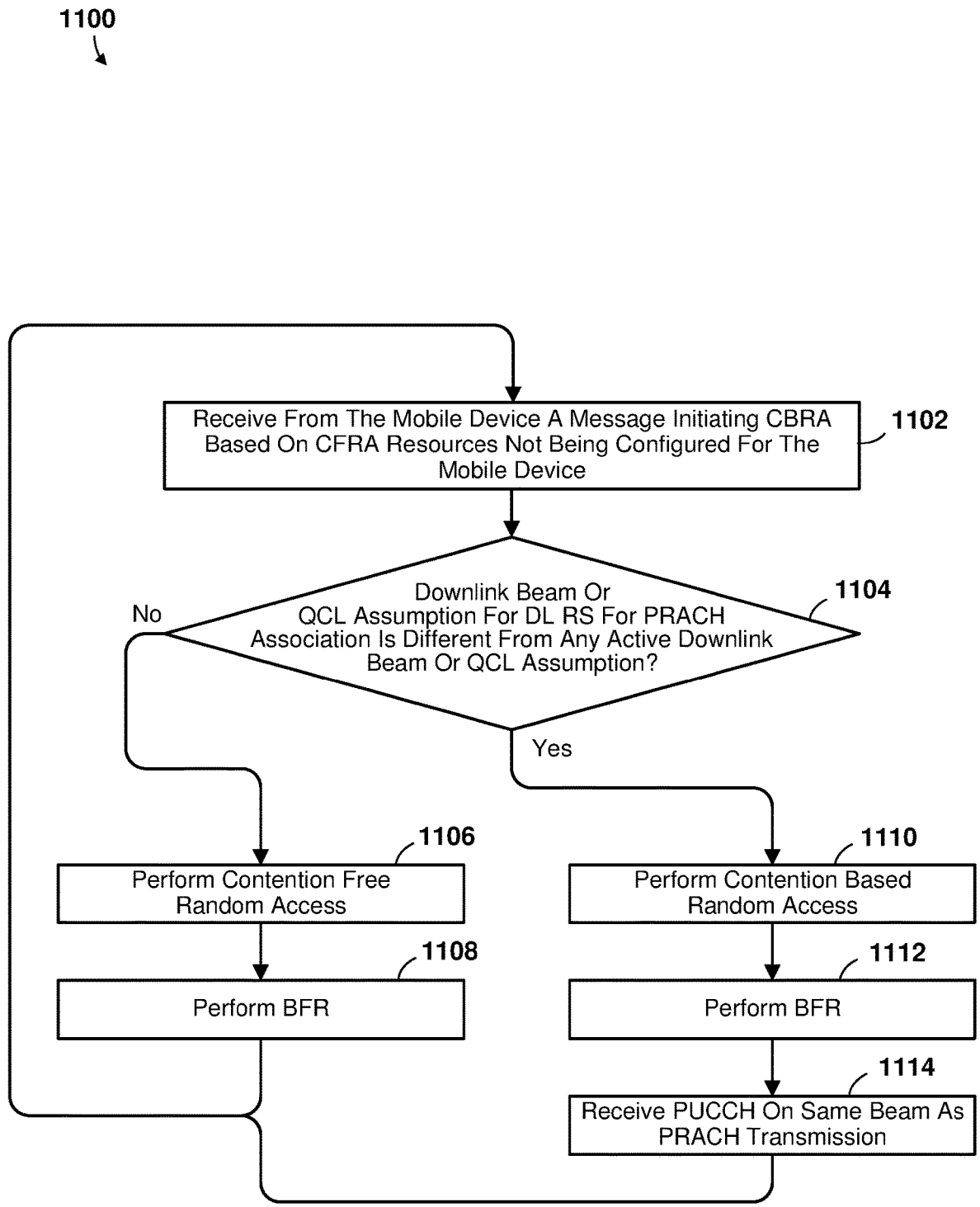
FIG. 11 is a process flow diagram illustrating a method that may be performed by a processor of a base station for managing beam failure recovery in accordance with various embodiments.

FIG. 11 is a process flow diagram illustrating a method 1100 that may be performed by a processor of a base station for managing beam failure recovery in accordance with various embodiments. With reference to FIGS. 1-11, the operations of the method 1100 may be performed by a processor (such as the processor 210, 212, 214, 216, 218, 252, 260, 432) of a base station (such as the base station 110a-120d, 200, 350, 404).

In block 1102, the processor may receive from a mobile device a message initiating contention based random access (CBRA) based on contention free random access (CFRA) resources not being configured for the mobile device. In some embodiments, the message may include a random access preamble. In some embodiments, the processor may determine a beam that will be used by the mobile device, for example, for a physical uplink control channel (PUCCH). Means for performing the operations of block 1102 may include a processor (such as the processor 210, 212, 214, 216, 218, 252, 260, 432) coupled to a wireless transceiver (e.g., 266).

In determination block 1104, the processor may determine whether a downlink beam or QCL assumption a downlink resource of a PRACH is different from any active downlink beam or QCL assumption. Means for performing the operations of determination block 1104 may include a processor (such as the processor 210, 212, 214, 216, 218, 252, 260, 432) coupled to a wireless transceiver (e.g., 266).

In response to determining that the downlink beam or QCL assumption a downlink resource of a PRACH is not different from any active downlink beam or QCL assumption (i.e., determination block 1104="No"), the processor may perform CFRA (e.g., with the mobile device) in block 1106. Means for performing the operations of determination block 1106 may include a processor (such as the processor 210, 212, 214, 216, 218, 252, 260, 432) coupled to a wireless transceiver (e.g., 266).

In block 1108, the processor may perform one or more beam failure recovery operations. Means for performing the operations of determination block 1108 may include a processor (such as the processor 210, 212, 214, 216, 218, 252, 260, 432) coupled to a wireless transceiver (e.g., 266).

In response to determining that the downlink beam or QCL assumption a downlink resource of a PRACH is different from any active downlink beam or QCL assumption (i.e., determination block 1104="Yes"), the processor may perform CBRA (e.g., with the mobile device) in block 1110. Means for performing the operations of determination block 1110 may include a processor (such as the processor 210, 212, 214, 216, 218, 252, 260, 432) coupled to a wireless transceiver (e.g., 266).

In block 1112, the processor may perform one or more beam failure recovery operations. Means for performing the operations of determination block 1112 may include a processor (such as the processor 210, 212, 214, 216, 218, 252, 260, 432) coupled to a wireless transceiver (e.g., 266).

In block 1114, the processor may receive a PUCCH message on a same beam as a PRACH transmission. For example, the processor may receive a PUCCH message from the mobile device on a same beam on which the processor received the message initiating CBRA (e.g., block 1102). In some embodiments, the processor may switch a receive beam (an Rx beam). In some embodiments, the processor may set a PUCCH beam to a PRACH beam. In some embodiments, the processor may determine based on one or more PRACH characteristics and on one or more other conditions to reset the PUCCH beam to a PRACH beam. In some embodiments, the processor may receive the PUCCH on the same beam as the PRACH transmission after a successful completion of CBRA beam failure recovery (e.g., block 1112). In some embodiments, the processor may reset the PUCCH beam to a PRACH beam (e.g., for a PCell or a PSCell) after a threshold number of symbols (e.g., 28 symbols) from a last symbol of a first PDCCH reception where the mobile device may detect a DCI format with CRC scrambled by C-RNTI and/or until the processor sends to the mobile device an activation command for PUCCH-SpatialRelationInfo or is provided PUCCH-SpatialRelationInfo for one or more PUCCH resources. Under such conditions, the processor may expect the mobile device to transmit a PUCCH on a same cell as the PRACH transmission, for example, using one or more of a same spatial filter as for the last PRACH transmission and a determined power. Means for performing the operations of block 1102 may include a processor (such as the processor 210, 212, 214, 216, 218, 252, 260, 432) coupled to a wireless transceiver (e.g., 266).

Following the operations of blocks 1108 or 1114, the processor may again perform the operations of block 1102.

Figure 12:
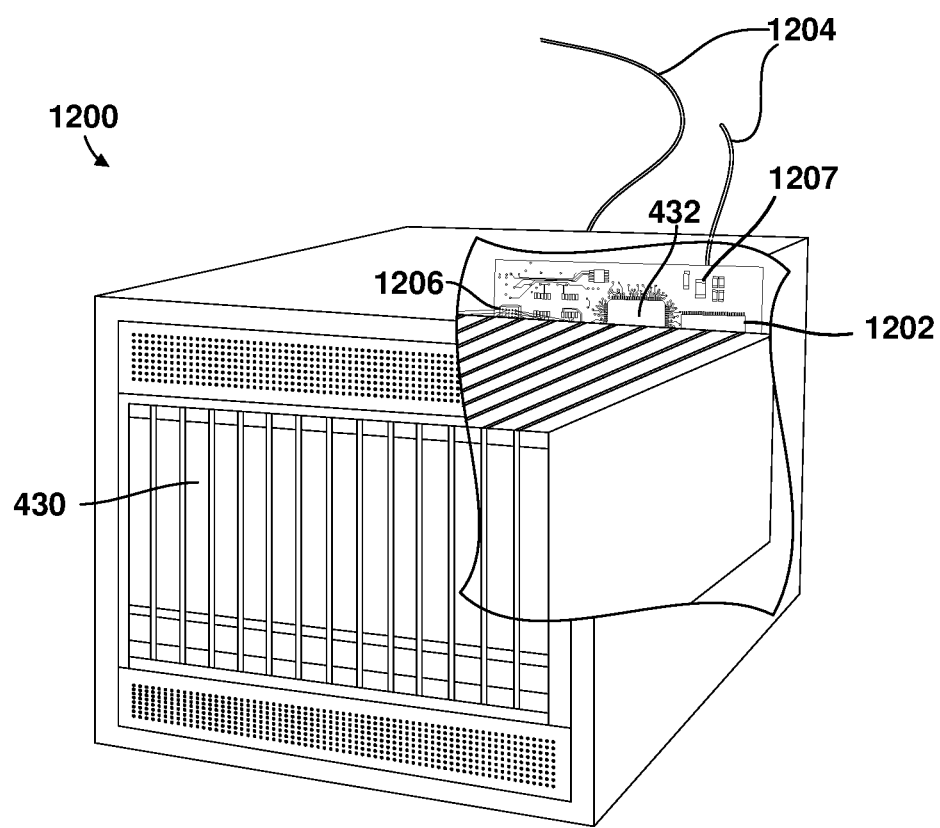
FIG. 12 is a component block diagram of a network computing device suitable for use with various embodiments.

FIG. 12 is a component block diagram of a network computing device suitable for use with various embodiments. Such network computing devices (e.g., base station 110a-110d, 404) may include at least the components illustrated in FIG. 12. With reference to FIGS. 1-12, the network computing device 1200 may typically include a processor 432 coupled to volatile memory 1202 and a large capacity nonvolatile memory, such as a disk drive 430. The network computing device 1200 also may include a peripheral memory access device 1206 such as a floppy disc drive, compact disc (CD) or digital video disc (DVD) drive coupled to the processor 432. The network computing device 1200 also may include network access ports 1204 (or interfaces) coupled to the processor 432 for establishing data connections with a network, such as the Internet or a local area network coupled to other system computers and servers. The network computing device 1200 may include one or more antennas 1207 for sending and receiving electromagnetic radiation that may be connected to a wireless communication link. The network computing device 1200 may include additional access ports, such as USB, Firewire, Thunderbolt, and the like for coupling to peripherals, external memory, or other devices.

Figure 13:
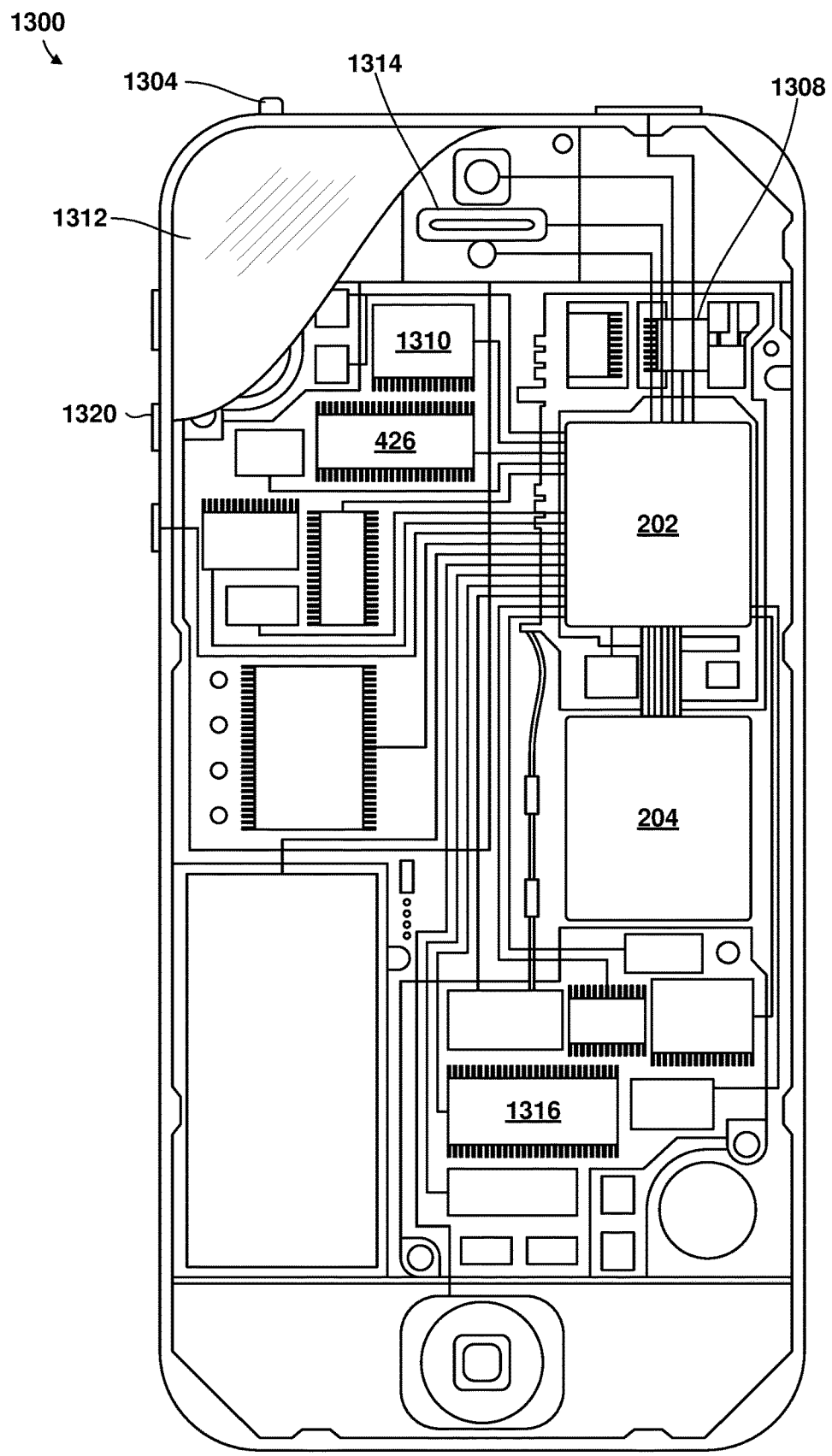
FIG. 13 is a component block diagram of a wireless communication device suitable for use with various embodiments.

FIG. 13 is a component block diagram of a mobile device 1300 suitable for use with various embodiments. With reference to FIGS. 1-13, various embodiments may be implemented on a variety of mobile devices 1300 (for example, the mobile device 120a-120e, 200, 320, 402), an example of which is illustrated in FIG. 13 in the form of a smartphone. The mobile device 1300 may include a first SOC 202 (for example, a SOC-CPU) coupled to a second SOC 204 (for example, a 5G capable SOC). The first and second SOCs 202, 204 may be coupled to internal memory 426, 1316 (e.g., 426), a display 1312, and to a speaker 1314. Additionally, the mobile device 1300 may include an antenna 1304 for sending and receiving electromagnetic radiation that may be connected to a wireless transceiver 1308 (e.g., 266) coupled to one or more processors in the first or second SOCs 202, 204. Smartphones 1300 typically also include menu selection buttons or rocker switches 1320 for receiving user inputs.

A mobile device 1300 may also include a sound encoding/decoding (CODEC) circuit 1310, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 1308 and CODEC 1310 may include a digital signal processor (DSP) circuit (not shown separately).

The processors of the network computing device 1200 and the mobile device 1300 may be any programmable microprocessor, microcomputer or multiple processor chip or chips that can be configured by software instructions (applications) to perform a variety of functions, including the functions of some implementations described below. In some mobile devices, multiple processors may be provided, such as one processor within an SOC 204 dedicated to wireless communication functions and one processor within an SOC 202 dedicated to running other applications. Software applications may be stored in the memory 1206, 426 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a mobile device and the mobile device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (CPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 600, 700, 800, 900, 1000, and 1100 may be substituted for or combined with one or more operations of the methods 600, 700, 800, 900, 1000, and 1100.

Implementation examples are described in the following paragraphs. While some of the following implementation examples are described in terms of example methods, further example implementations may include: the example methods discussed in the following paragraphs implemented by a mobile device or a base station including a processor configured with processor-executable instructions to perform operations of the methods of the following implementation examples; the example methods discussed in the following paragraphs implemented by a mobile device or a base station including means for performing functions of the methods of the following implementation examples; and the example methods discussed in the following paragraphs may be implemented as a non-transitory processor-readable storage medium having stored thereon processor-executable instructions configured to cause a processor of a mobile device or a base station to perform the operations of the methods of the following implementation examples.

Example 1. A method performed by a processor of a mobile device for managing beam failure recovery (BFR), including: determining whether a beam failure of a communication link with a base station has occurred; determining whether contention free random access (CFRA) resources have been configured in response to determining that a beam failure has occurred; and initiating contention based random access (CBRA) in response to determining that CFRA resources have not been configured.

Example 2. The method of example 1, in which initiating CBRA includes transmitting a PRACH preamble selected by the mobile device.

Example 3. The method of any of examples 1 and 2, further including selecting a random access channel (RACH) occasion in response to determining that a beam failure has occurred, in which determining whether CFRA resources have been configured in response to determining that a beam failure has occurred includes determining whether CFRA resources associated with the selected RACH occasion have been configured in response to determining that a beam failure has occurred.

Example 4. The method of any of examples 1-3, in which determining that CFRA resources have not been configured includes determining that a downlink beam or quasi-colocation (QCL) assumption for a downlink reference signal (DL RS) that is mapped to the selected RACH occasion is different from any active downlink beam or QCL assumption.

Example 5. The method of any of examples 1-4, in which determining that a downlink beam or QCL assumption for a DL RS that is mapped to the selected RACH occasion is different from any active downlink beam or QCL assumption includes determining that the downlink beam or QCL assumption for a DL RS that is mapped to the selected RACH occasion is different from any activated transmission configuration indicator (TCI) state for one or more of a physical downlink control channel (PDCCH) and a physical downlink shared channel (PDSCH).

Example 6. The method of example 4, in which determining that a downlink beam or QCL assumption for a DL RS that is mapped to the selected RACH occasion is different from any active downlink beam or QCL assumption includes determining that the downlink beam or QCL assumption for a DL RS that is mapped to the selected RACH occasion is different from any activated TCI state for a PDCCH having a CORESET that is monitored for beam failure detection.

Example 7. The method of example 4, in which determining that CFRA resources have not been configured includes determining that a downlink beam or QCL assumption for a DL RS that is mapped to the selected RACH occasion is different from any active downlink beam or QCL assumption and an uplink beam or spatial relation for a physical random access channel (PRACH) is different from any active uplink beam or spatial relation.

Example 8. The method of any of examples 1-7, in which determining that CFRA resources have not been configured includes determining that an uplink beam or spatial relation for a PRACH is different from any active uplink beam or spatial relation.

Example 9. The method of any of examples 1-8, further including determining based on one or more PRACH characteristics and on one or more other conditions to reset a physical uplink control channel (PUCCH) beam to a PRACH beam.

Example 10. The method of example 9, in which the one or more other conditions includes: after a threshold number of symbols from a last symbol of a first PDCCH reception where the mobile device detects a downlink control information (DCI) format with a cyclic redundancy check (CRC) scrambled by a cell radio network temporary identifier (C-RNTI); and the mobile device has received an activation command for PUCCH-SpatialRelationInfo or has received PUCCH-SpatialRelationInfo for one or more PUCCH resources.

Example 11. The method of example 10, further including transmitting a PUCCH on a same cell as a PRACH transmission.

Example 12. A method performed by a processor of a base station for managing beam failure recovery (BFR), including: receiving from a mobile device a message initiating contention based random access (CBRA) based on contention free random access (CFRA) resources not being configured for the mobile device; determining whether a downlink beam or quasi-colocation (QCL) assumption a downlink resource of a physical random access channel (PRACH) is different from any active downlink beam or QCL assumption; and performing CBRA with the mobile device in response to determining that the downlink beam or QCL assumption a downlink resource of a PRACH is different from any active downlink beam or QCL assumption.

Example 13. The method of example 12, further including receiving a PUCCH message on a same beam as a PRACH transmission.

Example 14. The method of any of example 13, further including resetting a PUCCH beam to a PRACH beam based on one or more PRACH characteristics and on one or more other conditions.

Example 15. The method of example 14, in which the one or more other conditions include: after a threshold number of symbols from a last symbol of a first PDCCH reception where the mobile device detects a downlink control information (DCI) format with a cyclic redundancy check (CRC) scrambled by a cell radio network temporary identifier (C-RNTI); and transmitting an activation command for PUCCH-SpatialRelationInfo or PUCCH-SpatialRelationInfo for one or more PUCCH resources.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a mobile device for managing beam failure recovery (BFR), comprising:
   determining whether a beam failure of a communication link with a base station has occurred;
   determining whether contention free random access (CFRA) resources have been configured in response to determining that a beam failure has occurred;
   initiating contention based random access (CBRA) in response to determining that CFRA resources have not been configured; and
   determining to reset a physical uplink control channel (PUCCH) beam to a physical random access channel (PRACH) beam based on one or more PRACH characteristics after a threshold number of symbols following a successful reception of a downlink control information (DCI).

2. The method of claim 1, wherein initiating CBRA comprises transmitting a PRACH preamble selected by the mobile device.

3. The method of claim 1, further comprising:
   selecting a random access channel (RACH) occasion in response to determining that a beam failure has occurred;
   wherein determining whether CFRA resources have been configured in response to determining that a beam failure has occurred comprises determining whether CFRA resources associated with the selected RACH occasion have been configured in response to determining that a beam failure has occurred.

4. The method of claim 1, wherein determining that CFRA resources have not been configured comprises determining that a downlink beam or quasi-colocation (QCL) assumption for a downlink reference signal (DL RS) that is mapped to the selected RACH occasion is different from any active downlink beam or QCL assumption.

5. The method of claim 4, wherein determining that a downlink beam or QCL assumption for a DL RS that is mapped to the selected RACH occasion is different from any active downlink beam or QCL assumption comprises determining that the downlink beam or QCL assumption for a DL RS that is mapped to the selected RACH occasion is different from any activated transmission configuration indicator (TCI) state for one or more of a physical downlink control channel (PDCCH) and a physical downlink shared channel (PDSCH).

6. The method of claim 4, wherein determining that a downlink beam or QCL assumption for a DL RS that is mapped to the selected RACH occasion is different from any active downlink beam or QCL assumption comprises determining that the downlink beam or QCL assumption for a DL RS that is mapped to the selected RACH occasion is different from any activated TCI state for a PDCCH having a CORESET that is monitored for beam failure detection.

7. The method of claim 4, wherein determining that CFRA resources have not been configured comprises determining that a downlink beam or QCL assumption for a DL RS that is mapped to the selected RACH occasion is different from any active downlink beam or QCL assumption and an uplink beam or spatial relation for a physical random access channel (PRACH) is different from any active uplink beam or spatial relation.

8. The method of claim 1, wherein determining that CFRA resources have not been configured comprises determining that an uplink beam or spatial relation for a physical random access channel (PRACH) is different from any active uplink beam or spatial relation.

9. The method of claim 1, wherein determining to reset a PUCCH beam to a PRACH beam based on one or more PRACH characteristics after a threshold number of symbols following a successful reception of a DCI comprises determining to reset the PUCCH beam to a PRACH beam based on one or more PRACH characteristics after a threshold number of symbols from a last symbol of a first PDCCH reception where the mobile device detects a DCI format with a cyclic redundancy check (CRC) scrambled by a cell radio network temporary identifier (C-RNTI), and until the mobile device has received an activation command to configure spatial relation information for a PUCCH or has received spatial relation information for one or more PUCCH resources.

10. The method of claim 1, further comprising:
    transmitting a PUCCH on a same cell as a PRACH transmission.

11. A mobile device, comprising:
    a transceiver; and
    a processor coupled to the transceiver and configured with processor-executable instructions to perform operations comprising:
       determining whether a beam failure of a communication link with a base station has occurred;
       determining whether contention free random access (CFRA) resources have been configured in response to determining that a beam failure has occurred;
       initiating contention based random access (CBRA) in response to determining that CFRA resources have not been configured; and
       determining to reset a physical uplink control channel (PUCCH) beam to a physical random access channel (PRACH) beam based on one or more PRACH characteristics after a threshold number of symbols following a successful reception of a downlink control information (DCI).

12. The mobile device of claim 11, wherein the processor is further configured with processor-executable instructions to perform operations such that initiating CBRA comprises transmitting a PRACH preamble selected by the mobile device.

13. The mobile device of claim 11, wherein the processor is further configured with processor-executable instructions to perform operations further comprising:
    selecting a random access channel (RACH) occasion in response to determining that a beam failure has occurred;
    wherein determining whether CFRA resources have been configured in response to determining that a beam failure has occurred comprises determining whether CFRA resources associated with the selected RACH occasion have been configured in response to determining that a beam failure has occurred.

14. The mobile device of claim 11, wherein the processor is further configured with processor-executable instructions to perform operations such that determining that CFRA resources have not been configured comprises determining that a downlink beam or quasi-colocation (QCL) assumption for a downlink reference signal (DL RS) that is mapped to the selected RACH occasion is different from any active downlink beam or QCL assumption.

15. The mobile device of claim 14, wherein the processor is further configured with processor-executable instructions to perform operations such that determining that a downlink beam or QCL assumption for a DL RS that is mapped to the selected RACH occasion is different from any active downlink beam or QCL assumption comprises determining that the downlink beam or QCL assumption for a DL RS that is mapped to the selected RACH occasion is different from any activated transmission configuration indicator (TCI) state for one or more of a physical downlink control channel (PDCCH) and a physical downlink shared channel (PDSCH).

16. The mobile device of claim 14, wherein the processor is further configured with processor-executable instructions to perform operations such that determining that a downlink beam or QCL assumption for a DL RS that is mapped to the selected RACH occasion is different from any active downlink beam or QCL assumption comprises determining that the downlink beam or QCL assumption for a DL RS that is mapped to the selected RACH occasion is different from any activated TCI state for a PDCCH having a CORESET that is monitored for beam failure detection.

17. The mobile device of claim 14, wherein the processor is further configured with processor-executable instructions to perform operations such that determining that CFRA resources have not been configured comprises determining that a downlink beam or QCL assumption for a DL RS that is mapped to the selected RACH occasion is different from any active downlink beam or QCL assumption and an uplink beam or spatial relation for a physical random access channel (PRACH) is different from any active uplink beam or spatial relation.

18. The mobile device of claim 11, wherein the processor is further configured with processor-executable instructions to perform operations such that determining that CFRA resources have not been configured comprises determining that an uplink beam or spatial relation for a physical random access channel (PRACH) is different from any active uplink beam or spatial relation.

19. The mobile device of claim 11, wherein the processor is further configured with processor-executable instructions to perform operations such that determining to reset a PUCCH beam to a PRACH beam based on one or more PRACH characteristics after a threshold number of symbols following a successful reception of a DCI comprises:
   determining to reset the PUCCH beam to a PRACH beam based on one or more PRACH characteristics after a threshold number of symbols from a last symbol of a first PDCCH reception where the mobile device detects a DCI format with a cyclic redundancy check (CRC) scrambled by a cell radio network temporary identifier (C-RNTI); and
   until the mobile device has received an activation command to configure spatial relation information for a PUCCH or has received spatial relation information for one or more PUCCH resources.

20. The mobile device of claim 19, wherein the processor is further configured with processor-executable instructions to perform operations further comprising:
   transmitting a PUCCH on a same cell as a PRACH transmission.

21. A method performed by a processor of a base station for managing beam failure recovery (BFR), comprising:
   receiving from a mobile device a message initiating contention based random access (CBRA) based on contention free random access (CFRA) resources not being configured for the mobile device;
   determining whether a downlink beam or quasi-colocation (QCL) assumption a downlink resource of a physical random access channel (PRACH) is different from any active downlink beam or QCL assumption;
   performing CBRA with the mobile device in response to determining that the downlink beam or QCL assumption a downlink resource of a PRACH is different from any active downlink beam or QCL assumption; and
   resetting a PUCCH beam to a PRACH beam based on one or more PRACH characteristics after a threshold number of symbols following a successful reception of a downlink control information (DCI).

22. The method of claim 21, further comprising receiving a PUCCH message on a same beam as a PRACH transmission.

23. The method of claim 21, wherein resetting a PUCCH beam to a PRACH beam based on one or more PRACH characteristics after a threshold number of symbols following a successful reception of a DCI comprises:
   resetting the PUCCH beam to a PRACH beam based on one or more PRACH characteristics after a threshold number of symbols from a last symbol of a first PDCCH reception where the mobile device detects a DCI format with a cyclic redundancy check (CRC) scrambled by a cell radio network temporary identifier (C-RNTI) and until transmitting an activation command to configure spatial relation information for a PUCCH or spatial relation information for one or more PUCCH resources.

24. A base station, comprising:
   a transceiver; and
   a processor coupled to the transceiver and configured with processor-executable instructions to perform operations comprising:
      receiving from a mobile device a message initiating contention based random access (CBRA) based on contention free random access (CFRA) resources not being configured for the mobile device;
      determining whether a downlink beam or quasi-colocation (QCL) assumption a downlink resource of a physical random access channel (PRACH) is different from any active downlink beam or QCL assumption;
      performing CBRA with the mobile device in response to determining that the downlink beam or QCL assumption a downlink resource of a PRACH is different from any active downlink beam or QCL assumption; and
      resetting a PUCCH beam to a PRACH beam based on one or more PRACH characteristics after a threshold number of symbols following a successful reception of a downlink control information (DCI).

25. The base station of claim 24, wherein the processor is further configured with processor-executable instructions to perform operations further comprising receiving a PUCCH message on a same beam as a PRACH transmission.

26. The base station of claim 24, wherein the processor is further configured with processor-executable instructions to perform operations such that resetting a PUCCH beam to a PRACH beam based on one or more PRACH characteristics after a threshold number of symbols following a successful reception of a DCI comprises:
   resetting the PUCCH beam to a PRACH beam based on one or more PRACH characteristics after a threshold number of symbols from a last symbol of a first PDCCH reception where the mobile device detects a DCI format with a cyclic redundancy check (CRC) scrambled by a cell radio network temporary identifier (C-RNTI) and until transmitting an activation command to configure spatial relation information for a PUCCH or spatial relation information for one or more PUCCH resources.

* * * * *